(12) United States Patent
Kim et al.

(10) Patent No.: US 8,982,807 B2
(45) Date of Patent: Mar. 17, 2015

(54) METHOD AND APPARATUS FOR TRANSMITTING AND RECEIVING HARQ BURST

(75) Inventors: Sang-Eon Kim, Seoul (KR); Sang-Sung Han, Seongnam-si (KR); Ji-Won Lee, Seongnam-si (KR); Jeong-Tae Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 13/171,855

(22) Filed: Jun. 29, 2011

(65) Prior Publication Data

US 2012/0002619 A1  Jan. 5, 2012

(30) Foreign Application Priority Data

Jun. 30, 2010  (KR) .................. 10-2010-0062662

(51) Int. Cl.
*H04W 4/00* (2009.01)
*H04L 1/18* (2006.01)
*H04L 1/00* (2006.01)

(52) U.S. Cl.
CPC ............ *H04L 1/1896* (2013.01); *H04L 1/1864* (2013.01); *H04L 1/1887* (2013.01); *H04L 1/1893* (2013.01); *H04L 1/0061* (2013.01); *H04L 1/0075* (2013.01)

USPC ....................................................... 370/329

(58) Field of Classification Search
CPC ................... H04L 1/16; H04L 1/18
USPC ....................................................... 370/329
See application file for complete search history.

(56) References Cited

U.S. PATENT DOCUMENTS

| | | | |
|---|---|---|---|
| 2006/0092960 A1* | 5/2006 | Lee et al. ........................ | 370/412 |
| 2007/0133479 A1* | 6/2007 | Montojo et al. ................ | 370/335 |
| 2008/0065944 A1* | 3/2008 | Seol et al. ....................... | 714/748 |
| 2008/0069044 A1* | 3/2008 | Kimura et al. ................. | 370/329 |
| 2009/0059801 A1* | 3/2009 | Garrett et al. .................. | 370/242 |
| 2009/0168708 A1* | 7/2009 | Kumar et al. ................... | 370/329 |
| 2009/0228755 A1* | 9/2009 | Franovici ....................... | 714/751 |
| 2009/0276673 A1* | 11/2009 | Kone et al. ..................... | 714/749 |
| 2010/0135221 A1* | 6/2010 | Komura ......................... | 370/329 |
| 2011/0002309 A1* | 1/2011 | Park et al. ...................... | 370/335 |
| 2012/0147734 A1* | 6/2012 | Kim et al. ...................... | 370/216 |

* cited by examiner

*Primary Examiner* — Chi H Pham
*Assistant Examiner* — Fahmida Chowdhury
(74) *Attorney, Agent, or Firm* — Jefferson IP Law, LLP

(57) ABSTRACT

A method and apparatus for transmitting and receiving a Hybrid Automatic Repeat reQuest (HARQ) burst in a communication system are provided. A transmitter obtains at least one Protocol Data Unit (PDU) according to a decoding order of a receiver which supports a HARQ mode. The receiver controls an order of at least one HARQ burst using burst information including a HARQ Channel IDentifier (ACID).

28 Claims, 17 Drawing Sheets

METHOD AND APPARATUS FOR TRANSMITTING AND RECEIVING HARQ BURST

PRIORITY

The present application claims the benefit under 35 U.S.C. §119(a) of a Korean patent application filed in the Korean Intellectual Property Office on Jun. 30, 2010, and assigned Serial No. 10-2010-0062662, the entire disclosure of which is hereby incorporated by reference.

BACKGROUND OF THE INVENTION

1. Field of the Invention

The present invention relates to a technique for transmitting and receiving a Hybrid Automatic Repeat reQuest (HARQ) burst. More particularly, the present invention relates to a technique for more efficiently controlling an order of a HARQ burst or a Protocol Data Unit (PDU) by receiving the HARQ burst.

2. Description of the Related Art

Mobile communication services are beginning to provide broadcasting, multimedia video, e-mail, multimedia messaging, and other similar services. Services for wireless multimedia in the information age require various qualities such as low speed or high speed and real time or non real time communication. In this regard, new techniques for efficiently allocating a limited frequency band to users in a mobile communication system are under development. A wireless communication system may adopt wireless transmission techniques such as wireless multiple access and multiplexing, wireless high-speed packet transmission, radio link control, and so on.

For radio link control, Hybrid Automatic Repeat reQuest (HARQ) controls errors by combining Automatic Repeat reQuest (ARQ) and Forward Error Correction (FEC). A HARQ mode is applicable to packet data services such as wireless Internet.

According to decoding success or failure of the transmitted data, a receiver using the HARQ scheme transmits an ACKnowledge signal (ACK) or a Negative ACK signal (NACK), as a response signal, to a transmitter and thus requests the transmitter to retransmit the same data. When the decoding result received from the receiver is NACK, the transmitter retransmits the corresponding data. The receiver obtains a receive performance gain by combining the retransmitted data and the previous data. To acquire the performance gain by determining initial transmission/retransmission for the burst (a data set) transmitted from the transmitter and combining the data, the receiver stores the received burst for the HARQ operation.

SUMMARY OF THE INVENTION

Aspects of the present invention are to address at least the above-mentioned problems and/or disadvantages and to provide at least the advantages described below. Accordingly, an aspect of the present invention is to provide a method and an apparatus of a transmitter, and a method and an apparatus of a receiver for controlling a Hybrid Automatic Repeat reQuest (HARQ) mode with more efficient resource use by obtaining at least one Protocol Data Unit (PDU) according to a decoding order of the receiver which supports the HARQ mode.

Another aspect of the present invention is to provide a method and an apparatus of a transmitter, and a method and an apparatus of a receiver for controlling a HARQ mode more efficiently such that a HARQ burst used in the HARQ mode includes one or more PDUs and an order of the one or more PDUs is indicated as an arrangement order of the PDUs without using a separate field indicating the order of the PDUs.

Another aspect of the present invention is to provide a method and an apparatus of a transmitter, and a method and an apparatus of a receiver for enhancing a system performance by sequentially storing burst information including a HARQ Channel Identifier (ACID) in every frame and sequentially PDU-processing HARQ bursts starting from a HARQ burst corresponding to the burst information stored in a certain frame.

Another aspect of the present invention is to provide a method and an apparatus of a transmitter, and a method and an apparatus of a receiver for effectively utilizing resources by, when a Cyclic Redundancy Check (CRC) result of a HARQ burst of first burst information stored in a first frame indicates the presence of errors, retrieving second burst information of the same ACID as the ACID of the first burst information after the first frame in sequence, according to the burst information including the ACID and the CRC result.

According to an aspect of the present invention, a method of a receiver for receiving a Hybrid Automatic Repeat reQuest (HARQ) burst in a communication system is provided. The method includes receiving at least one HARQ burst from a transmitter, storing burst information including an ACID of the at least one HARQ burst for identifying a channel corresponding to the at least one HARQ burst, and controlling an order of the at least one HARQ burst using the ACID.

According to an exemplary implementation, the burst information may be sequentially stored per frame, and the controlling of the order of the HARQ burst comprises processing (PDUs of a HARQ burst in order starting from a HARQ burst corresponding to burst information stored in a certain frame according to the burst information.

According to an exemplary implementation, the burst information may further include a CRC result of the HARQ burst, and the controlling of the order of the HARQ burst comprise, when a CRC result of a HARQ burst in first burst information stored in a first frame indicates the presence of errors, searching for second burst information of the same ACID as an ACID of the first burst information, in sequence after the first frame.

According to an exemplary implementation, the burst information may further include a CRC result of the HARQ burst, and the controlling of the order of the HARQ burst may include, when a CRC result of a HARQ burst in first burst information stored in a first frame indicates the presence of errors, searching for second burst information of the same ACID as an ACID of the first burst information, in sequence after the first frame, and processing PDUs of a HARQ burst corresponding to the second burst information before HARQ bursts after the first frame.

According to an exemplary implementation, the burst information may further include a CRC result of the HARQ burst, and the controlling of the order of the HARQ burst may include, when a CRC result of a HARQ burst in first burst information stored in a first frame indicates the presence of errors, searching for second burst information of the same ACID as an ACID of the first burst information, in sequence after the first frame, processing PDUs of a HARQ burst corresponding to the second burst information before HARQ bursts after the first frame, and deleting the first burst information and the second burst information.

According to an exemplary implementation, the method may further include storing the at least one HARQ burst in a storage part. The allocating of the at least one HARQ burst to the storage part may include sequentially storing the at least one HARQ burst in the storage part regardless of a connection identifier of the transmitter or user information of the transmitter.

According to an exemplary implementation, the storing of the burst information may include detecting a storage region of the storage part storing the burst information according to at least one of the connection identifier of the transmitter and the user information of the transmitter, and sequentially storing the burst in the detected storage region per frame.

According to an exemplary implementation, the burst information may further include information of whether each frame includes a HARQ burst, information of whether the corresponding HARQ burst is a retransmission burst, and a CRC result of the corresponding HARQ burst.

According to another aspect of the present invention, a method of a transmitter for transmitting a HARQ burst in a communication system is provided. The method includes obtaining at least one PDU according to a decoding order of a receiver which supports a HARQ mode, and transmitting to at least one HARQ burst to the receiver, the HARQ burst including the at least one PDU and a burst CRC field.

According to an exemplary implementation, the at least one HARQ burst may each indicate an order of the at least one PDU using an arrangement order of the at least one PDU.

According to an exemplary implementation, the method may further include receiving, from the receiver, a control message including information which indicates that a field indicating an order of the at least one PDU is not supported. The control message may be at least one of a Subscriber Station Basic Capability (SBC) negotiation related message and a Dynamic Service Addition (DSA) related message.

According to an exemplary implementation, the method may further include transmitting a control message to the receiver, the control message including information indicating that a field indicating an order of the at least one PDU is not supported. The control message may be at least one of a SBC negotiation related message and a DSA related message.

According to an exemplary implementation, the decoding order of the receiver may indicate a pre-arranged resource allocation order for an uplink frame resource or a downlink frame resource, and the pre-arranged resource allocation order may be any one of a frequency-first order from a start slot of allocation in a resource allocated region, and a time-first order from the start slot of the allocation in the resource allocated region.

According to another aspect of the present invention, an apparatus of a receiver for receiving a HARQ burst in a communication system is provided. The apparatus includes a receiving part for receiving at least one HARQ burst from a transmitter, a storage part for storing burst information including an ACID of the at least one HARQ burst for identifying a channel corresponding to the at least one HARQ burst, and a control part for controlling an order of the at least one HARQ burst using the ACID.

According to an exemplary implementation, the control part may sequentially store the burst information per frame, and process PDUs of HARQ bursts in order starting from a HARQ burst corresponding to burst information stored in a certain frame according to the burst information.

According to an exemplary implementation, the burst information may further include a CRC result of the HARQ burst. When a CRC result of a HARQ burst in first burst information stored in a first frame indicates the presence of errors, the control part may search for second burst information of the same ACID as an ACID of the first burst information, in sequence after the first frame.

According to an exemplary implementation, the burst information may further include a CRC result of the HARQ burst. When a CRC result of a HARQ burst in first burst information stored in a first frame indicates the presence of errors, the control part may search for second burst information of the same ACID as an ACID of the first burst information, in sequence after the first frame, and process PDUs of a HARQ burst corresponding to the second burst information before HARQ bursts after the first frame.

According to an exemplary implementation, the burst information may further include a CRC result of the HARQ burst. When a CRC result of a HARQ burst in first burst information stored in a first frame indicates the presence of errors, the control part may search for second burst information of the same ACID as an ACID of the first burst information, in sequence after the first frame, process PDUs of a HARQ burst corresponding to the second burst information before HARQ bursts after the first frame, and delete the first burst information and the second burst information.

According to an exemplary implementation, the storage part may sequentially store the at least one HARQ burst, regardless of a connection identifier of the transmitter or user information of the transmitter.

According to an exemplary implementation, the control part may detect a storage region of the storage part which stores the burst information according to at least one of a connection identifier of the transmitter and user information of the transmitter, and sequentially store the burst information in the detected storage region per frame.

According to an exemplary implementation, the storage part may include a plurality of blocks, the blocks each in a preset size, and the control part may store the at least one HARQ burst in at least one of the blocks.

According to an exemplary implementation, then the at least one HARQ burst includes a first HARQ burst and a second HARQ burst and a portion of a particular block allocated the first HARQ burst is empty, the control part may store the second HARQ burst in a block other than the particular block.

According to an exemplary implementation, the storage part may include a plurality of blocks, the blocks each in a preset size, the burst information may further include allocation information indicating the at least one HARQ burst stored in the storage part, the allocation information may include a start address of at least one block storing a particular HARQ burst of the at least one HARQ burst, size information and connection information of the particular HARQ burst stored in the at least one block, and the connection information may, when the particular HARQ burst is divided and stored in at least two blocks, indicate connection of the at least two blocks.

According to an exemplary implementation, the burst information may further include information of whether each frame includes the HARQ burst, information of whether the corresponding HARQ burst is the retransmission burst, and a CRC result of the corresponding HARQ burst.

According to another aspect of the present invention, an apparatus of a transmitter for transmitting a HARQ burst in a communication system is provided. The apparatus includes a control part for obtaining at least one Protocol Data Unit (PDU) according to a decoding order of a receiver which supports a HARQ mode, and a transmitting part for transmitting, to the receiver, at least one HARQ burst including the at least one PDU and a burst CRC field.

According to an exemplary implementation, the at least one HARQ burst may each indicate an order of the at least one PDU using an arrangement order of the at least one PDU.

According to an exemplary implementation, the at least one PDU may include a Generic Media Access Control (MAC) Header (GMH), a payload, and a CRC field.

According to an exemplary implementation, the apparatus may further include a receiving part for receiving a control message from the receiver, the control message including information indicating that a field indicating an order of the at least one PDU is not supported. The control message may be at least one of a SBC negotiation related message and a DSA related message.

According to an exemplary implementation, the transmitter may transmit a control message to the receiver, the control message including information indicating that a field indicating an order of the at least one PDU is not supported, and the control message may be at least one of a SBC negotiation related message and a DSA related message.

According to an exemplary implementation, the decoding order of the receiver may indicate a pre-arranged resource allocation order for an uplink frame resource or a downlink frame resource, and the pre-arranged resource allocation order may be any one of a frequency-first order from a start slot of allocation in a resource allocated region, and a time-first order from the start slot of the allocation in the resource allocated region.

According to an exemplary implementation, the burst CRC field may be attached to data including the at least one PDU and used for the receiver to detect errors in the at least one HARQ burst.

According to an exemplary implementation, the at least one HARQ burst may occupy frequency and time resources corresponding to resource allocation information in a frame which carries the at least one HARQ burst, and the resource allocation information may include a ACID, a connection identifier, and a HARQ Identifier Sequence Number (AI SN) for each of the at least one HARQ burst.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
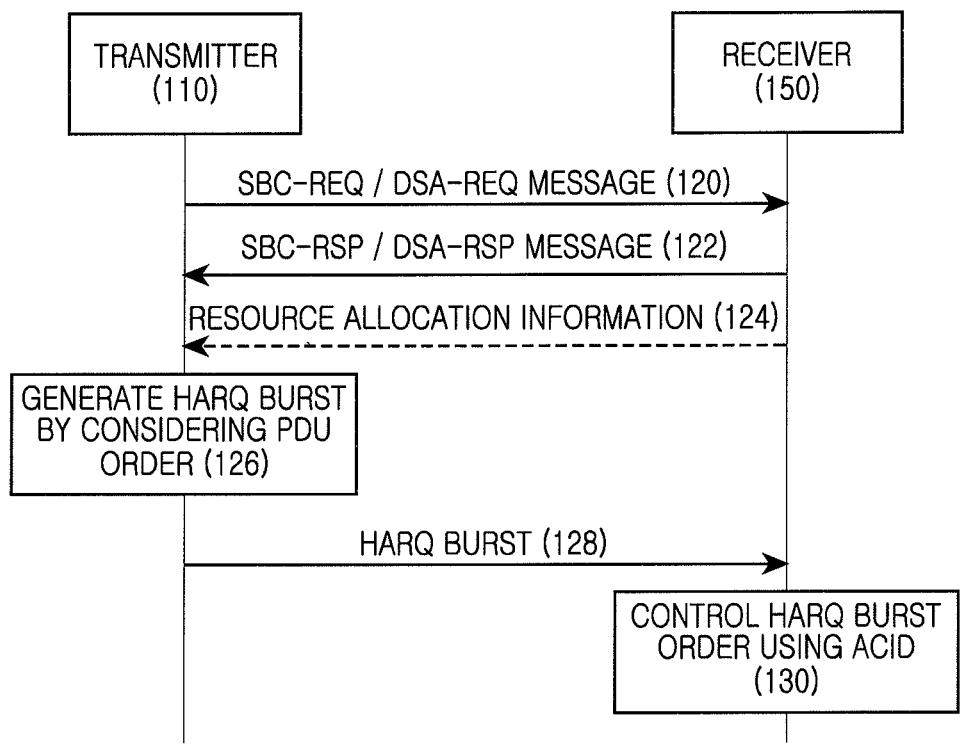
FIG. 1 is a signal exchange and flow chart between a transmitter and a receiver according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

Exemplary embodiments of the present invention provide a method and an apparatus for transmitting and receiving a Hybrid Automatic Repeat reQuest (HARQ) burst using a transmitter and a receiver in a communication system. The transmitter and the receiver may each transmit and receive signals, and be named after an entity for transmitting or receiving the HARQ burst. The transmitter, which transmits the HARQ burst in a downlink or an uplink, may be a base station or a user terminal. The receiver, which receives the HARQ burst in the uplink or the downlink, may be a base station or a user terminal. The base station and the user terminal may transmit and receive data in a communication system. The communication system is not limited to a particular signal type and a particular protocol according to data modulation and demodulation, and may employ various signal types and various protocols. The data may include control information, traffic, or padding. For example, the communication system may be systems based on Institute of Electrical and Electronics Engineers (IEEE) 802.16, WiMax, or Long Term Evolution (LTE). The base station, which manages resource allocation of the user terminal, may be at least one of a radio access unit, a base station controller, and a node in the network. The transmitter and the receiver each may be implemented as a single apparatus including transmission and reception functions.

FIG. 1 is a signal exchange and flow chart between a transmitter and a receiver according to an exemplary embodiment of the present invention.

Referring to FIG. 1, the transmitter 110 and the receiver 150 may negotiate whether to support a field indicating an order of Protocol Data Units (PDUs). The transmitter 110 may transmit to the receiver 150 a REQuest (REQ) message including information indicating that the field indicating the order of the PDUs is not supported in step 120. The REQ message transmitted from the transmitter 110, which is described below, may include a Subscriber Station Basic Capability (SBC) negotiation related message (SBC-REQ) or a Dynamic Service Addition (DSA) related message (DSA-REQ).

The receiver 150 transmits to the transmitter 110 a ReSPonse (RSP) message to the message transmitted from the transmitter 110 in step 122. The RSP message may include a SBC-RSP message or a DSA-RSP message.

The REQ message and the RSP message in step 120 and step 122 may be used for other functions. For example, the REQ message transmitted from the transmitter 110 may include the response for the receiver 150. Similarly, the RSP message transmitted from the receiver 150 may include the request for the transmitter 110.

Exemplary implementations of the present invention may not necessarily perform both step 120 and step 122. The transmitter 110 and the receiver 150 may negotiate about whether to support the field indicating the order of the PDUs in an unsolicited method. For example, the transmitter 110 may receive only the SBC-RSP message from the transmitter 150 without transmitting the SBC-REQ message, and complete the above-mentioned negotiation merely using SBC-RSP message. When the transmitter 110 and the receiver 150 pre-arrange not to support the field indicating the order of the PDUs, the negotiation of step 120 and step 122 may be omitted.

The receiver 150 may transmit resource allocation information to the transmitter 110 in step 124. The resource allocation information in step 124 may indicate uplink or downlink resources in at least one frame so that the transmitter 150 may transmit the burst.

To support the HARQ mode, the resource allocation information may include a HARQ Channel IDentifier (ACID), a connection identifier, and a HARQ Identifier Sequence Number (AI SN) for each HARQ burst. The ACID identifies a HARQ channel for at least one HARQ burst. One user may have at least one connection identifier, and the connection identifier may have at least one ACID. For example, one connection identifier may have 16 ACIDs. The number of the ACIDs available to each user or each connection identifier may be determined by considering a HARQ buffer size for operating the HARQ mode.

With the ACID and the AI SN, the receiver 150 may determine whether the HARQ burst indicated by the corresponding resource allocation information is an initial transmission or a retransmission. For example, when the ACID and the AI SN of the previously received resource allocation information are the same as the ACID and the AI SN of the newly received resource allocation information, the receiver 150 may determine that the corresponding HARQ burst is the retransmission. When the ACIDs of the previous received resource allocation information and the newly received resource allocation information are the same and the two AI SN values are different from each other, the receiver 150 may determine that the corresponding HARQ burst is the initial transmission.

When an entity for generating the resource allocation information is designated to the transmitter 110 in advance, step 124 may be omitted. In this case, the transmitter 110 may transmit the resource allocation information of step 124 to the receiver 150, or omit the exchange of the resource allocation information.

In step 126, the transmitter 110 obtains at least one PDU based on the signal decoding order of the receiver 140 which supports the HARQ mode, and generates a HARQ burst including at least one PDU.

In step 128, the transmitter 110 transmits to the receiver 150 at least one HARQ burst including the at least one PDU generated in step 126 and a burst Cyclic Redundancy Check (CRC) field. The HARQ burst of step 128 may occupy frequency and time resources corresponding to the resource allocation information of step 124 in the transmitted frame.

The receiver 150 receives the HARQ burst from the transmitter 110 in step 128. The receiver 150 may store the received HARQ burst in its storage part. The receiver 150 stores burst information including the ACIDs for the respective HARQ bursts, identifying the channels corresponding to the HARQ bursts respectively. The receiver 150 controls the order of the HARQ bursts using the ACID of the burst information in step 130. The ACID of step 130 may be contained in the resource allocation information of step 124. When step 124 is omitted, the ACID of step 130 may be contained in the resource allocation information received from the transmitter 110. The receiver 150 may be aware of the ACID of step 130 in advance through a scheduler or its internal entity.

According to an exemplary embodiment of the present invention, the HARQ burst may include at least one PDU, and the PDU may include a Generic Media Access Control (MAC) Header (GMH). The HARQ burst may indicate the order of one or more PDUs as the arrangement order of the PDUs, without using the separate field indicating the order of the PDUs.

Figure 2:
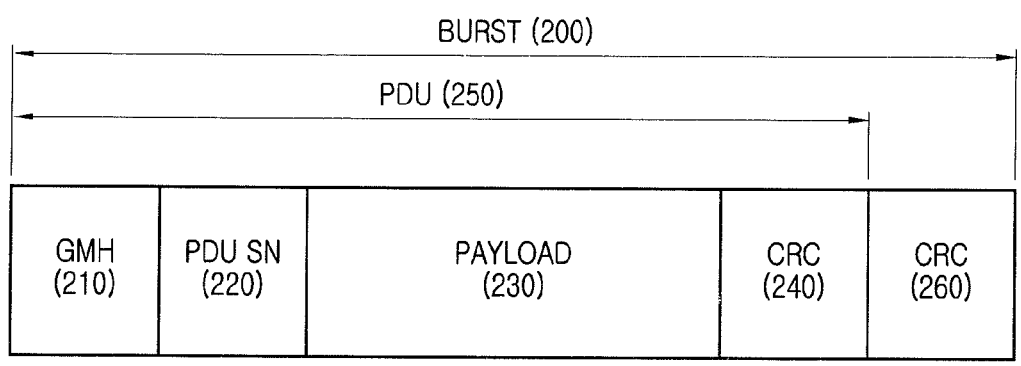
FIG. 2 is a diagram of a structure of a Hybrid Automatic Repeat reQuest (HARQ) burst according to an exemplary embodiment of the present invention.

FIG. 2 depicts a HARQ burst structure according to one exemplary embodiment of the present invention.

Referring to FIG. 2, the HARQ burst 200 may include a PDU 250 and a burst CRC 260. The HARQ burst 200 may further include a padding (not shown).

The PDU 250 may include a GMH 210, a PDU Sequence Number (SN) 220, payload 230, and a CRC 240. The GMH 210 may include a subheader, a Type field indicating a payload type, and a connection identifier field between the transmitter and the receiver or between the base station and the user terminal. The GMH 210 may include a length of the PDU 250, a header check sequence, an encryption key sequence, and a CRC Indicator (CI) field indicating whether the PDU 250 includes the CRC 240. The GMH 210 may include an Extended Subheader Field (ESF) indicating whether an extended subheader is contained. When the ESF indicates that the extended subheader is contained, the extended subheader may be used as the PDU SN 220 as the field indicating the order of the PDUs.

The burst CRC 260 is attached to data including the PDU 250, and may be used for the receiver supporting the HARQ mode to detect error in the HARQ bursts. The burst CRC 260 may cover the data including the PDU 250 and the padding. The burst CRC 260 may be used to detect errors in the data, except for the burst CRC 260, in the HARQ burst 200. The burst CRC 260 is omittable. To detect errors, the receiver may use the CRC 240 of the PDU 250 or other schemes in various implementations.

Figure 3:
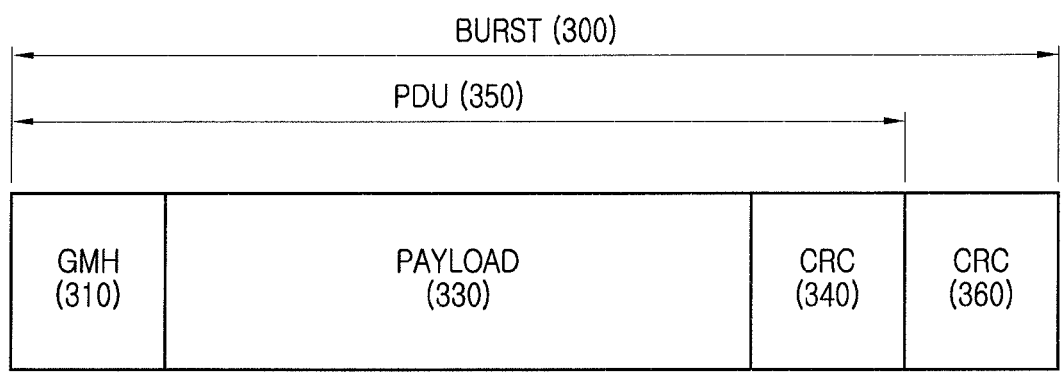
FIG. 3 is a diagram of the structure of a HARQ burst according to an exemplary embodiment of the present invention.

FIG. 3 depicts a HARQ burst structure according to an exemplary embodiment of the present invention.

Referring to FIG. 3, a HARQ burst 300 may include a PDU 350 and a burst CRC 360. The HARQ burst 300 may further include a padding (not shown).

The PDU 350 may include a GMH 310, payload 330, and a CRC 340. The GMH 310 may include a Type field, a connection identifier field between the transmitter and the receiver (or between the base station and the user terminal), and an ESF. When the ESF indicates that the extended subheader is not contained, the PDU SN 220 of FIG. 2 may be omitted.

To control the HARQ mode regardless of the PDU SN 220, the transmitter may obtain the HARQ burst by taking account of the order of the PDU 350. When the HARQ burst 300 includes a plurality of the PDUs 350, the order of the PDUs in the HARQ burst 300 may be arranged based on the decoding order of the receiver. When the transmitter transmits the HARQ burst 300 including the PDUs arranged over the frame in order, the receiver may obtain the order of the PDUs of the HARQ burst 300 according to the decoding order of the received HARQ burst 300. When the plurality of the HARQ bursts is concurrently transmitted from the transmitter, the PDUs in the HARQ may be arranged in order based on the decoding order of the receiver. When the plurality of the HARQ bursts is concurrently transmitted, the order of the HARQ bursts occupying the resource may be controlled based on the decoding order of the receiver. The burst CRC 360 is attached to data including the PDU 350, and may be used for the receiver supporting the HARQ mode to detect errors in the HARQ bursts.

Figure 4:
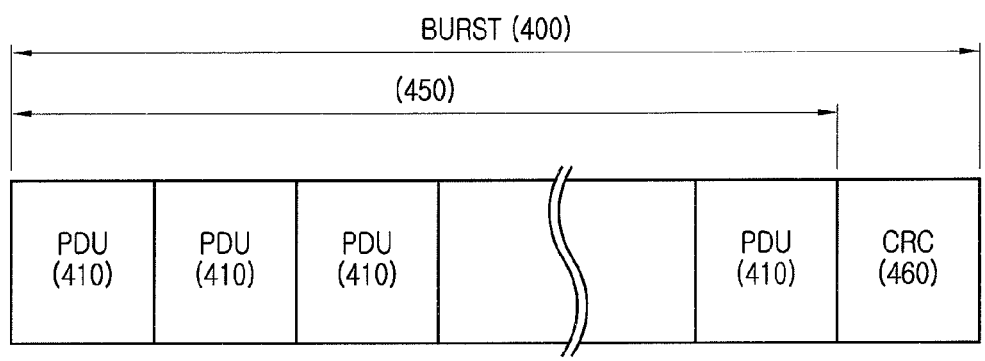
FIG. 4 is a diagram of the structure of a HARQ burst according to an exemplary embodiment of the present invention.

FIG. 4 depicts a HARQ burst structure according to an exemplary embodiment of the present invention.

Referring to FIG. 4, a HARQ burst 400 may include a plurality of PDUs 450 and a burst CRC 260. The HARQ burst 400 may further include a padding (not shown).

The PDU 410 of the PDUs 450 may be the PDU 250 of FIG. 2 or the PDU 350 of FIG. 3. For example, the HARQ burst 400 may omit the PDU SN 220 indicating the order of the PDUs of FIG. 2 in the PDUs 450.

The transmitter may generate the HARQ burst based on the order of the PDUs 450. The order of the PDUs in the HARQ burst 400 may be arranged based on the decoding order of the receiver. When the plurality of the HARQ bursts is concurrently transmitted from the transmitter, the PDUs 450 in each HARQ may be arranged in order based on the decoding order of the receiver. When the plurality of the HARQ bursts is concurrently transmitted, the order of the HARQ bursts occupying the resource may be controlled based on the decoding order of the receiver. The burst CRC 460 is attached to data including the PDU 450, and may be used for the receiver supporting the HARQ mode to detect the errors in the HARQ bursts.

Figure 5:
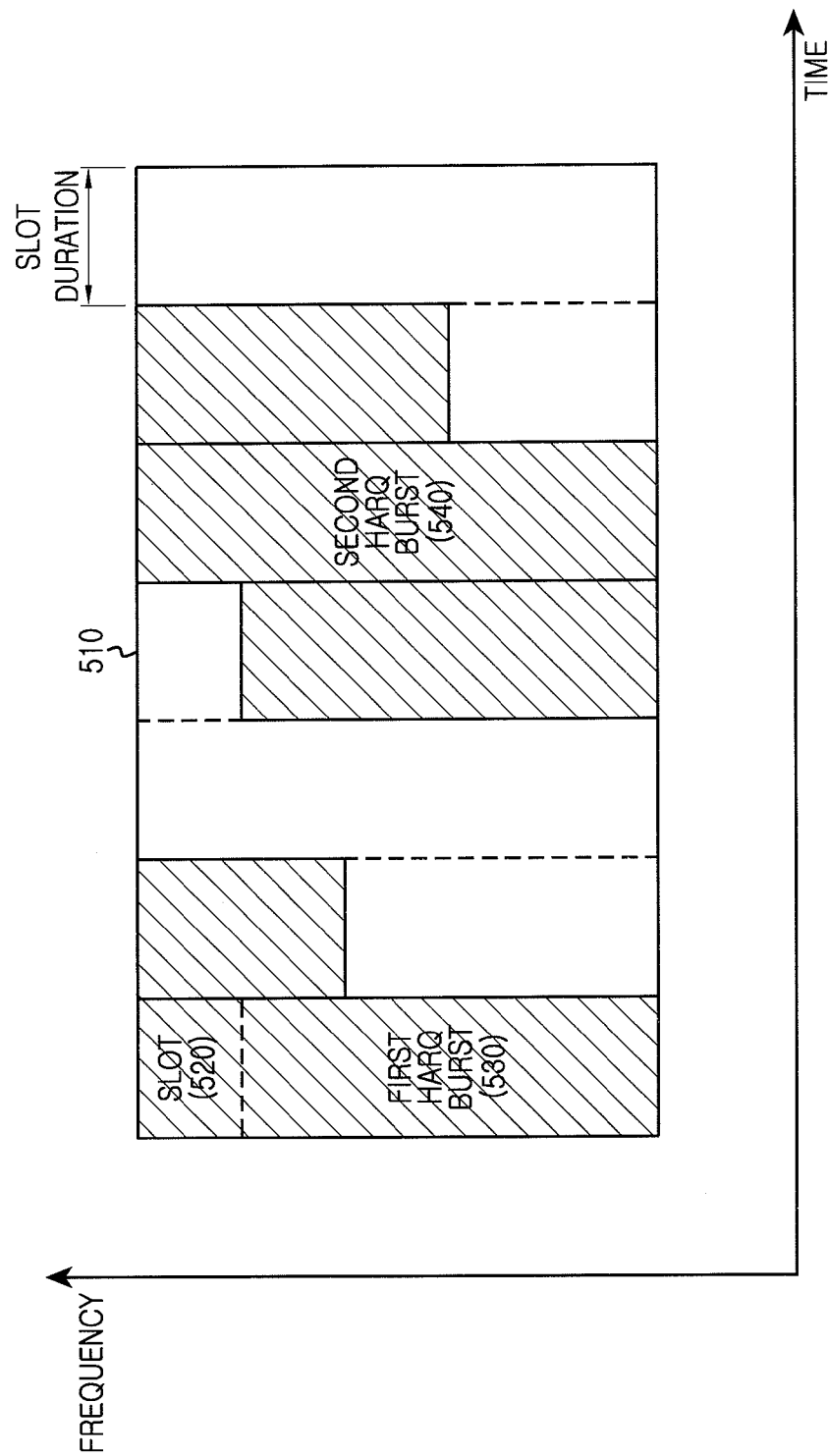
FIG. 5 is a diagram of a resource allocation order according to an exemplary embodiment of the present invention.

FIG. 5 depicts a resource allocation order according to one exemplary embodiment of the present invention.

Referring to FIG. 5, the transmitter may obtain at least one PDU and generate the HARQ burst including the at least one PDU based on the decoding order of the receiver which supports the HARQ mode. The signal decoding order of the receiver may indicate a pre-arranged resource allocation order for the uplink frame resource or the downlink frame resource. The pre-arranged resource allocation order may a frequency-first order from a start slot of the allocation in the resource allocated region.

For example, the resource allocation may define a two-dimensional region 510 and indicate the resource for the HARQ burst by setting length, number, and duration of slots in the two-dimensional region 510. When two HARQ bursts are resource-allocated at the same time, the first HARQ burst 530 and the second HARQ burst 540 may be allocated in the frequency-first order.

When FIG. 5 shows the frame resource of an Orthogonal Frequency Division Multiple Access (OFDM) system, the slot 520 may be a minimum allocation unit of the uplink frame resource or the downlink frame resource. For example, the slot 520 may be a two-dimensional region covering a preset number of subchannels and a preset number of OFDM symbols. The allocation region for particular HARQ bursts may be designated first to the two-dimensional region 510. The particular HARQ bursts are allocated through the length (or the number) of the slots, and may occupy the region as long as each slot in the two-dimensional region 510 according to the allocation order. The slot 520 may be a start slot of the first HARQ burst 530. Since the first HARQ burst 530 is allocated first in the two-dimensional region 510, the start slot (the slot 520) of the first HARQ burst 530 may be located by designating the two-dimensional region 510.

The first HARQ burst 530 may be allocated in the frequency-first order from the start slot 520. The frequency domain of a particular slot time duration is previously allocated to the first HARQ burst 530. When the entire frequency domain of the particular slot time duration is allocated to the first HARQ burst 530, the frequency domain of the next slot time duration may be allocated to the first HARQ burst 530.

The second HARQ burst 540 may determine the start slot of the slots allocated to the second HARQ burst 540 by counting the lengths of the slots allocated to the preceding HARQ bursts. Based on the decoding order of the receiver, the order of the resource occupation of the first HARQ burst 530 and the second HARQ burst 540 simultaneously transmitted may be controlled. The transmitter may control the order of the PDUs in the HARQ burst by taking into account the order of the resource allocation for the HARQ burst or the decoding order of the receiver.

Figure 6:
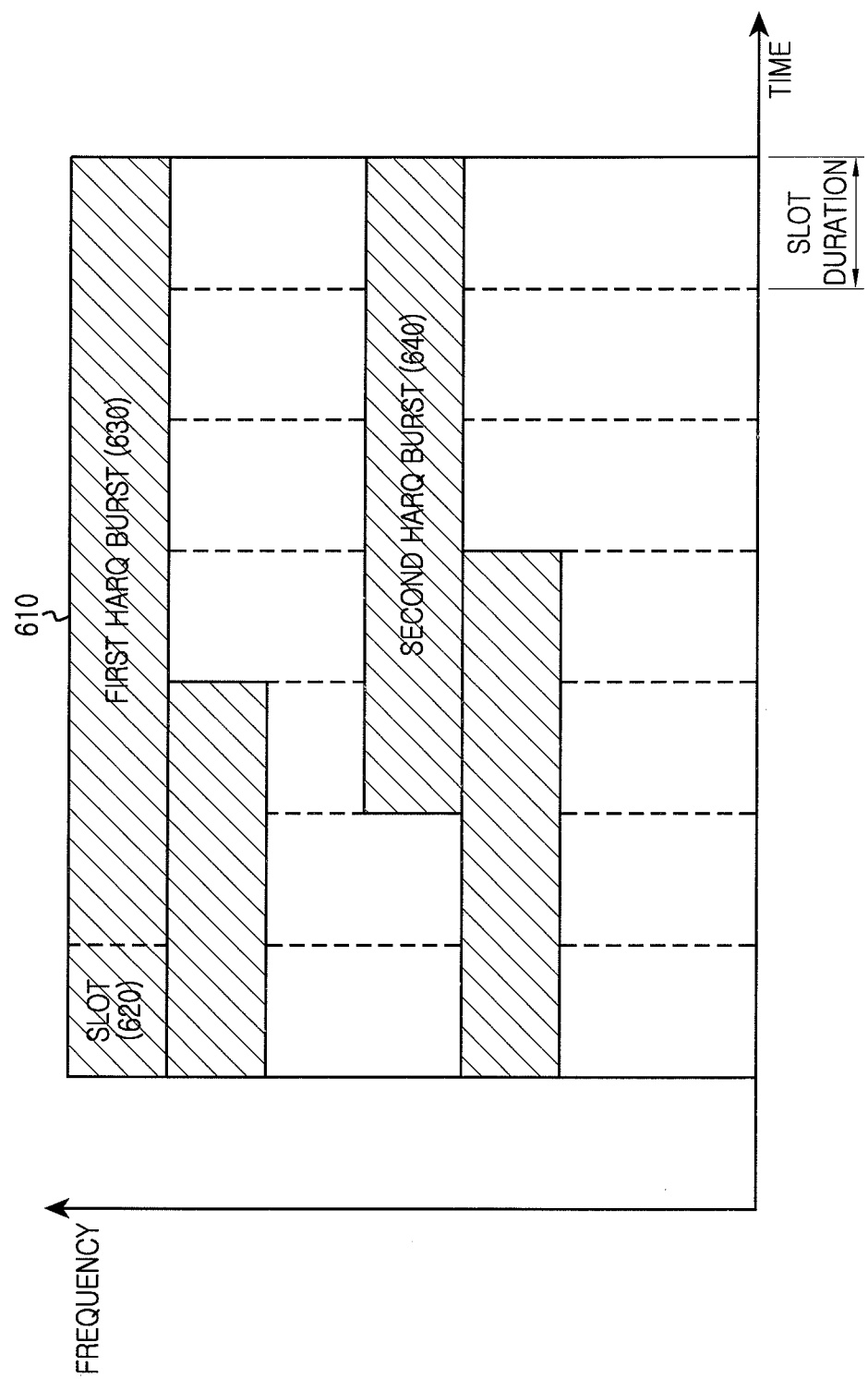
FIG. 6 is a diagram of a resource allocation order according to an exemplary embodiment of the present invention.

FIG. 6 depicts a resource allocation order according to an exemplary embodiment of the present invention.

Referring to FIG. 6, the transmitter may obtain at least one PDU and generate the HARQ burst including the at least one PDU based on the decoding order of the receiver which supports the HARQ mode. The signal decoding order of the receiver may indicate the pre-arranged resource allocation order for the uplink frame resource or the downlink frame resource. Alternatively, the pre-arranged resource allocation order may be a time-first order from the start slot of the allocation in the resource allocated region.

For example, the resource allocation may define the two-dimensional region of FIG. 6 or indicate the resource for the HARQ burst by setting length, number, and duration of slots in a region 610 for transmitting the HARQ burst in the downlink frame or the uplink frame. When two HARQ bursts are allocated the resource at the same time, the first HARQ burst 630 and the second HARQ burst 640 may be allocated in the time-first order. When the first HARQ burst 630 is allocated in the time-first order from the start slot 620 of the first HARQ burst 630 and reaches the boundary of the region 610, the first HARQ burst 630 may occupy the time domain of the next slot frequency duration. The start slot of the second HARQ burst 640 may be determined by counting lengths of the slots of other preceding HARQ bursts.

Alternatively, the transmitter may control the order of the PDUs in the HARQ burst by taking account of the pre-arranged resource allocation order or the pre-arranged decoding order of the receiver. For example, when the receiver decodes the second HARQ burst 640 ahead of the first HARQ burst 630, the transmitter may control the PDU acquisition such that the PDUs of the second HARQ bursts 640 are processed before the PDUs of the first HARQ burst 630.

Figure 7:
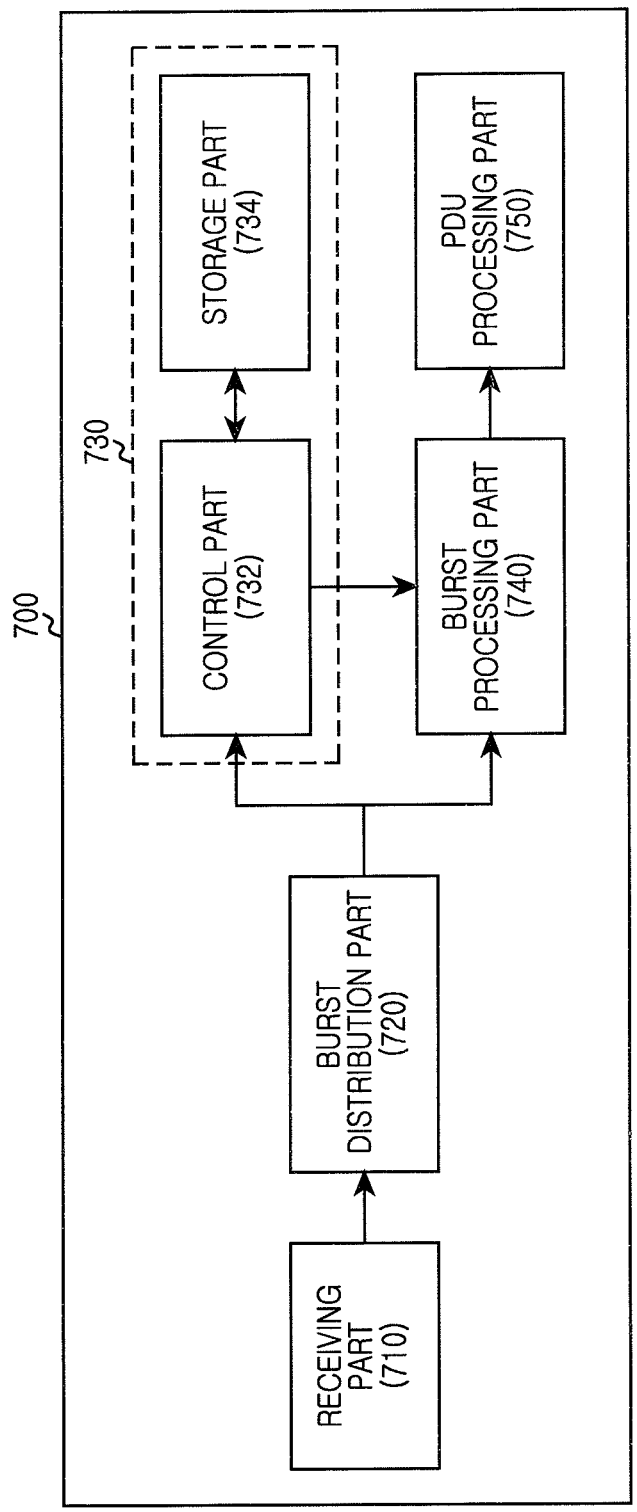
FIG. 7 is a block diagram of a receiver according to an exemplary embodiment of the present invention.

FIG. 7 is a block diagram of a receiver according to an exemplary embodiment of the present invention.

Referring to FIG. 7, the receiver 700 includes a receiving part 710 and a HARQ processing part 730. The HARQ processing part 730 includes a control part 732 and a storage part 734. The receiver 700 may further include a burst distribution part 720, a burst processing part 740, and a PDU processing part 750. The receiver 700 may include additional and/or different units. Similarly, the functionality of two or more of the above units may be integrated into a single component.

The receiving part 710 receives at least one HARQ burst from the transmitter. The receiving part 710 may receive the resource allocation information from the transmitter. A signal received at the receiving part 710 may include a non-HARQ burst. The burst distribution part 720 divides the received bursts into the HARQ burst and the non-HARQ burst and distributes them to the HARQ processing part 730 and the burst processing part 740 respectively.

The control part 732 stores the HARQ burst in the storage part 734. The control part 732 obtains the burst information including the ACIDs of the HARQ bursts. The burst information may further include information of whether each frame includes the HARQ burst, information of whether the corresponding HARQ burst is the retransmission burst, and the CRC result of the corresponding HARQ burst. The control part 732 may determine whether the HARQ burst exists and whether the HARQ burst is the retransmission burst, through a scheduler (not shown) or an internal entity (not shown) or based on the resource allocation information.

The control part 732 controls the order of the HARQ burst using the ACID of the burst information. When an error is detected in the received HARQ burst, the control part 732 may input the re-received HARQ burst without the error to the burst processing part 740. When an error is detected in the received HARQ burst, the control part 732 may obtain the decoding gain by combining the re-received HARQ burst without error and the previously received HARQ burst. When an error is detected in the received HARQ burst, the control part 732 may decode only the error-free retransmitted HARQ burst.

The control part 732 may sequentially store the burst information in every frame. According to the burst information, the control part 732 may process PDUs of the first HARQ burst corresponding to the burst information stored in a certain frame.

The storage part 734 stores the burst information including the ACIDs of the HARQ bursts. The storage part 732 may store the HARQ burst. The storage part 734 is described below with respect to FIGS. 8 through 11.

The burst processing part 740 may receive the non-HARQ burst from the burst distribution part 720 and the HARQ burst orderly controlled from the HARQ processing part 730. The burst processing part 740 may distinguish the PDUs in the received burst and perform a CRC check of the PDU, a concatenation, or a parsing of the PDU header. The PDU processing part 750 processes and provides the PDUs to a service in an upper layer or divides the PDUs to Service Data Units (SDUs). The PDU processing part 750 may function as the burst processing part 740. In this case, the separate burst processing part 740 may be omitted.

Each HARQ burst received at the receiving part 710 may indicate the order of the PDUs using the arrangement order of the PDUs, without using the separate field indicative of the order of one or more PDUs. The HARQ burst received at the receiving part 710 may include the separate field indicating the order of one or more PDUs. When the arrangement order of the PDUs or the arrangement order of the burst matches the separate field indicating the order of one or more PDUs, the receiver 700 may control the order of the HARQ burst and the order of the PDUs regardless of the separate field indicating the order of the PDUs.

Figure 8:
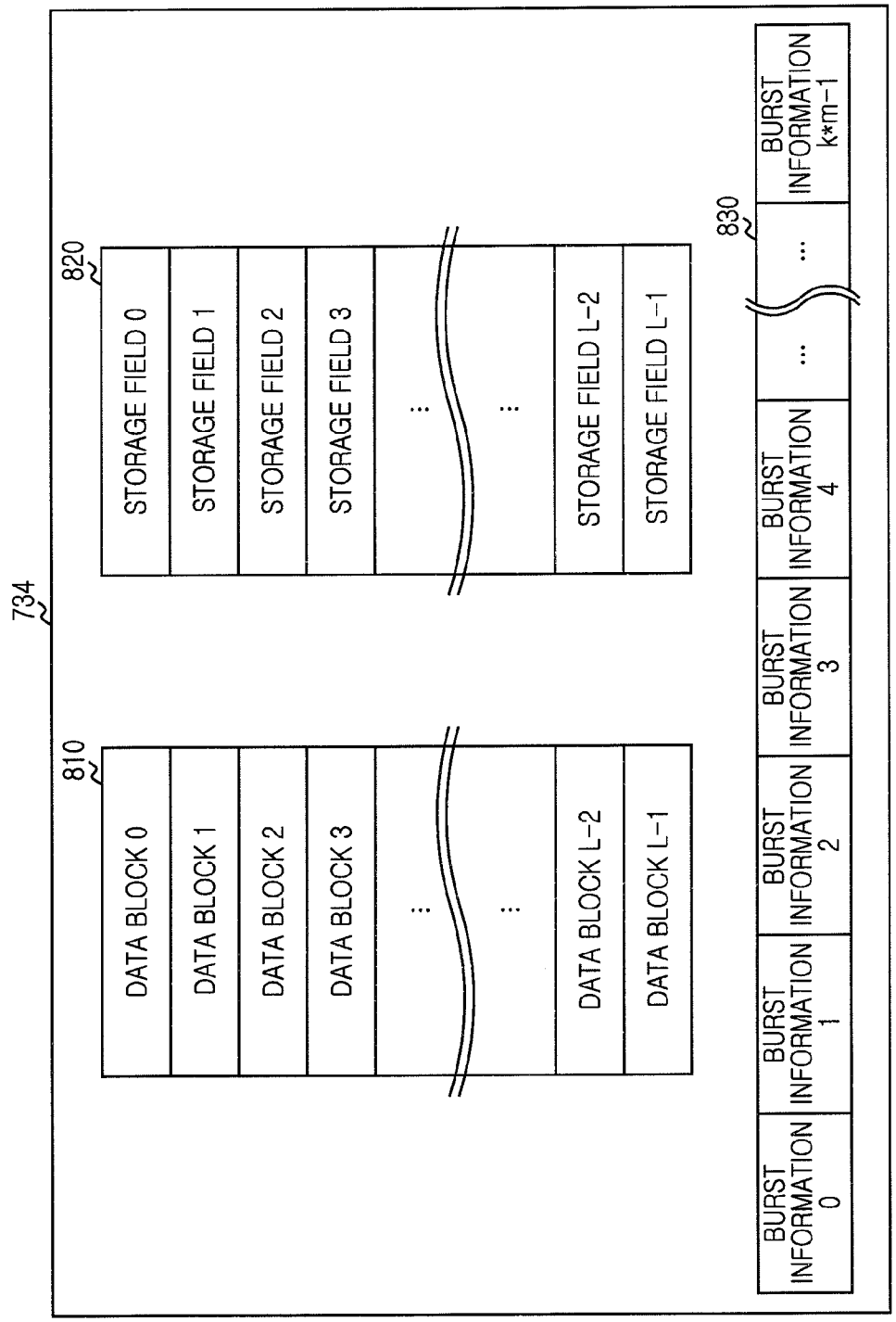
FIG. 8 is a diagram of a storage part according to an exemplary embodiment of the present invention.

FIG. 8 depicts a storage part according to an exemplary embodiment of the present invention.

Referring to FIG. 8, the storage part 734 of FIG. 7 may include a data region 810, an allocation information region 820, and a burst information region 830.

Upon receiving the HARQ burst, the control part 732 of FIG. 7 may control to store the HARQ burst to the data region 810 and to store the allocation information indicating the stored HARQ burst to the allocation information region 820. The control part 732 may control to store the burst information including the ACID corresponding to the HARQ burst and the information indicating the allocation information, to the burst information region 830.

The data region 810 may include a plurality of blocks. The data region 810 may include L blocks from the block 0 to the block L−1. Each individual block may be in a preset size. The control part 732 of FIG. 7 may store the HARQ burst in at least one of the blocks. The control part 732 may sequentially store the received HARQ bursts in the data region 810 regardless of the connection identifier of the transmitter or the user information of the transmitter. When receiving the first HARQ burst and the second HARQ burst, the control part 732 may store the HARQ bursts in the data region 810.

When a certain block allocated the first HARQ burst is partially empty, the control part 732 may not store the second HARQ burst in the certain block. The control part 732 may instead store the second HARQ burst in a different block. For example, when the block size is 2048 bytes, the block 1 is filled with a certain burst, and the block 0, the block 2, and the block 3 are not occupied by the burst, and the size of the first HARQ burst is greater than 2048 bytes and less than 4096 bytes, the control part 732 may determine that two blocks are necessary and store the first HARQ burst to block 0 and block 2 of the data region 810.

The control part 732 may sequentially store the second HARQ burst to the blocks starting from the block 3 of the data region 810. While a portion of the block 2 occupied by the first HARQ burst is empty, the control part 732 may store the first HARQ burst and the second HARQ burst in different blocks. When the processing of the particular HARQ burst is completed, the burst stored in at least one block containing the corresponding HARQ burst may be erased. In this case, the order of storing the HARQ burst and the order of deleting the HARQ burst may differ from each other. The control part 732 may check the CRC result of the HARQ burst, detect the HARQ burst with the CRC result indicating that no errors are present, and store the detected HARQ burst to the data region 810 of the storage part 734.

The allocation information region 820 may store the allocation information indicating the HARQ burst stored in the data region 810 of the storage part 734. The allocation information may include a start address of at least one corresponding block storing the particular HARQ burst in the data region 810, the HARQ burst size stored in the corresponding block, and the connection information.

The blocks of the data region 810 and storage fields of the allocation information region 820 may be mapped one-to-one. When a particular HARQ burst is divided and stored in at least two blocks, the connection information may indicate the connection of the at least two blocks. When the particular HARQ burst is allocated at least two blocks, the connection information may be an index indicating the block allocated after the corresponding block. For example, the allocation information region 820 may include the same number L of the storage fields as the blocks of the data region 810.

The storage fields may store address, size, and connection information corresponding to the respective blocks of the data region 810. Each storage field may be in a preset size. The storage fields may be mapped to indexes from 0 to L−1. The blocks of the data region 810 and the storage fields of the allocation information region 820 may be mapped one-to-one.

When the first HARQ burst is stored in the block 0 and the block 2 of the data region 810, the storage field 0 may contain the start address, the size, and the connection information of the HARQ burst stored in the block 0. The connection information may indicate the index corresponding to the next block storing the relevant HARQ burst. In this case, the connection information in the storage field 0 may be the index 2. The storage field 2 may contain the start address, the size, and the connection information of the HARQ burst stored in the block 2. Since the first HARQ burst is stored only in the two blocks, the connection information in the storage field 2 may be empty or a preset value.

The burst information region 830 stores the burst information including the ACID corresponding to the HARQ burst. The burst information may include the ACID corresponding to the HARQ burst, information about whether each frame includes the HARQ burst, information about whether the corresponding HARQ burst is the retransmission burst, and the CRC result of the corresponding HARQ burst.

The burst information may include the allocation information indicating the HARQ burst stored in the storage part 734. The allocation information may be the index of the storage field corresponding to the HARQ burst in the allocation information region 820. The burst information may include the index indicating the allocation information. The control part 732 of FIG. 7 may control to sequentially store the burst information to the burst information region 830 in every frame.

For example, the burst information region 830 may store burst information ranging from burst information 0 to burst information k*m−1. k denotes the total number of the frames for storing the burst information and m denotes the maximum number of the HARQ burst receivable in one frame. When the burst information region 830 contains the burst information 0 stored in the frame 0 through the burst information k*m−1 stored in the frame k−1, the burst information k*m−1 in the frame k may be stored in the burst information 0 of the burst information region 830. The burst information is stored in the burst information region 830 in each frame. When there is no region available, the burst information field of the oldest frame is replaced by new burst information of the recent frame and the new burst information is stored. The burst information region 830 may store the burst information as circulating the frames in the limited region.

Figure 9:
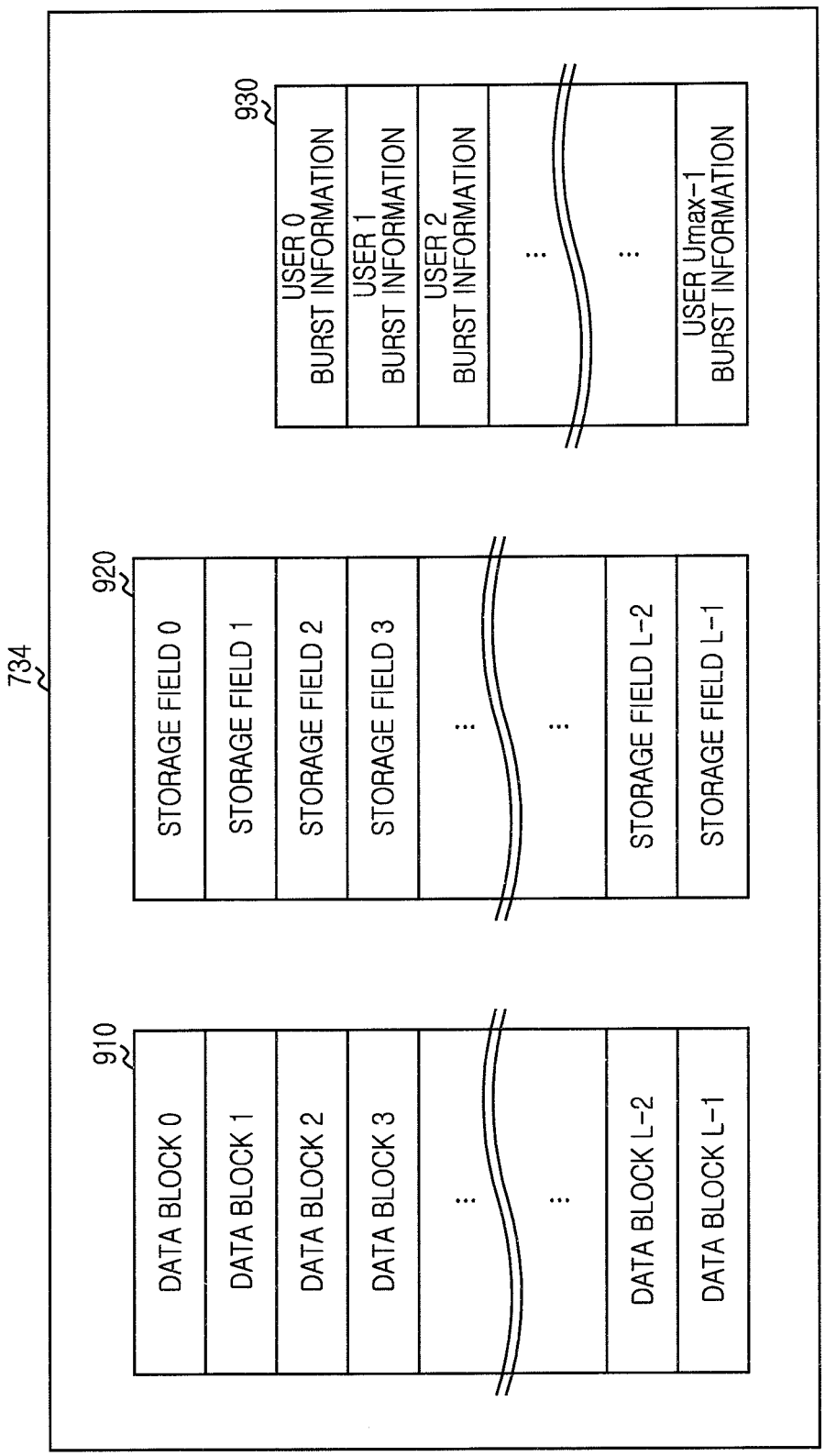
FIG. 9 is a diagram of a storage part according to an exemplary embodiment of the present invention.

FIG. 9 depicts a storage part according to an exemplary embodiment of the present invention. FIG. 9 illustrates a logical structure of the storage part when signals are received from a plurality of users, a plurality of transmitters, or a plurality of user terminals.

Referring to FIG. 9, the storage part 734 may include a data region 910, an allocation information region 920, and a burst information region 930.

The data region 910 may include blocks from block 0 to block L−1. Each individual block may be in a preset size. The control part 732 of FIG. 7 may store the HARQ burst in at least one of the blocks. The control part 732 may sequentially store the corresponding HARQ burst in the data region 810 starting from the empty block, regardless of the connection identifier of the transmitter corresponding to the HARQ burst or the user information of the transmitter.

The allocation information region 920 may store the allocation information indicating the HARQ burst stored in the data region 910. The allocation information may include the start address of at least one block storing the particular HARQ burst, the HARQ burst size stored in the corresponding blocks, and the connection information. The blocks of the data region 910 and the storage fields of the allocation information region 920 may be mapped one-to-one. For example, the allocation information region 920 may include the same number L of the storage fields as the blocks of the data region 910. The storage fields may store address, size, and connection information corresponding to the blocks of the data region 910. Each storage field may be in a preset size. The storage fields may be mapped to indexes from 0 to L−1.

The burst information region 930 may include a storage region of the burst information corresponding to the users (or the transmitters) which transmit the HARQ bursts. The burst information region 930 may include a storage region of the burst information corresponding to the connection identifier between the transmitter and the receiver 700 corresponding to the HARQ burst. The control part 732 of FIG. 7 may detect the storage region of the burst information region 930 storing the burst information according to at least one of the connection identifier and the user information of the transmitter, and sequentially store the burst information in the detected storage region in every frame.

The storage region for storing the burst information corresponding to the connection identifier or the transmitter may be of the same structure as the burst information region 830 of FIG. 8. One user may have at least one connection identifier, and each connection identifier may have at least one HARQ channel (e.g., the ACID). For example, one connection identifier may have 16 ACIDs. When the number of the users is Umax, the burst information region 930 may include the storage region corresponding to the users ranging from the user 0 through the user Umax−1. When the user 1 gets the service corresponding to three connection identifiers, the burst information for the user 1 may be sequentially stored in the storage region of the user 1 in the burst information region 930 in each frame regardless of the connection identifiers.

In various implementations, the identifier for distinguishing the user may use the index of bits smaller than the connection identifier, or the identifier for distinguishing the user may be equal to or smaller than the number of the connection identifiers of the user. By means of the identifier for distinguishing the user, the storage resource for managing the burst information may be saved. When the storage regions of the burst information region 930 store the burst information corresponding to a particular connection identifier, the burst information of the HARQ bursts using the same connection identifier may be stored in one particular storage region.

Figure 10:
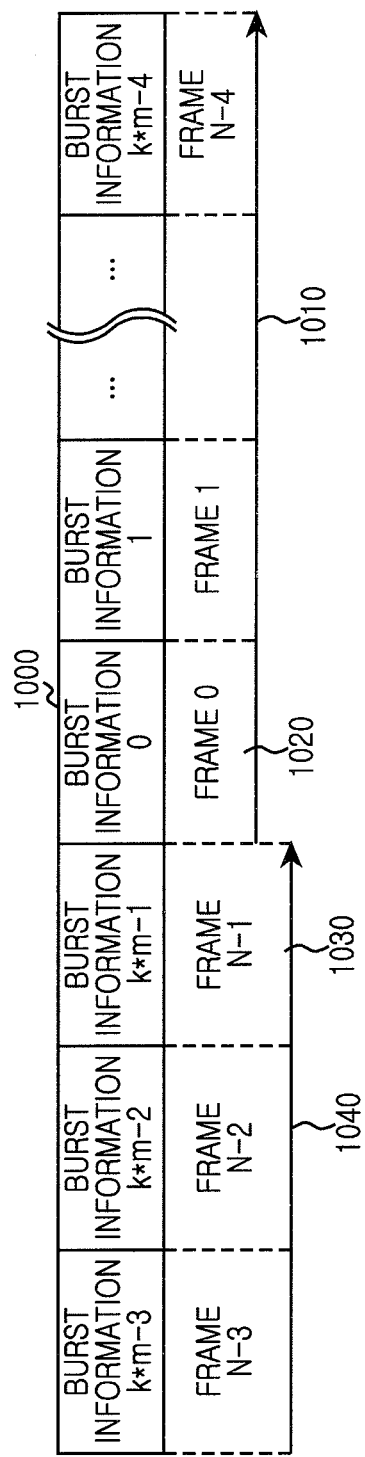
FIG. 10 is a diagram of burst information in a storage part according to an exemplary embodiment of the present invention.

FIG. 10 depicts burst information in a storage part according to an exemplary embodiment of the present invention.

The burst information region 1000 may be the burst information region 830 of FIG. 8, or one storage region storing the burst information of a particular user in the burst information region 930 of FIG. 9. For example, the burst information region 1000 may store the burst information from the burst information 0 to the burst information k*m−1, and the burst information k*m−1 may be stored in the burst information region 1000 in the frame N−1 1030 at a certain time. k denotes the total number of the frames for storing the burst information and m denotes the maximum number of the HARQ bursts receivable in one frame. In FIG. 10, m is 1, and thus the number of the HARQ bursts receivable over one frame is 1.

The burst information region 1000 may store the burst information while circulating the frames in the limited region. The burst information is stored from the frame 0 1020 to the frame N−1 1030 along the arrow 1010, and then the burst information may be stored along the arrow 1040. The burst information k*m (not shown) in the frame k may be stored in the location of the burst information 0 of the frame 0 1020. In so doing, the direction for storing the burst information may vary according to the time indicated by the arrow 1010 through the arrow 1030.

Figure 11:
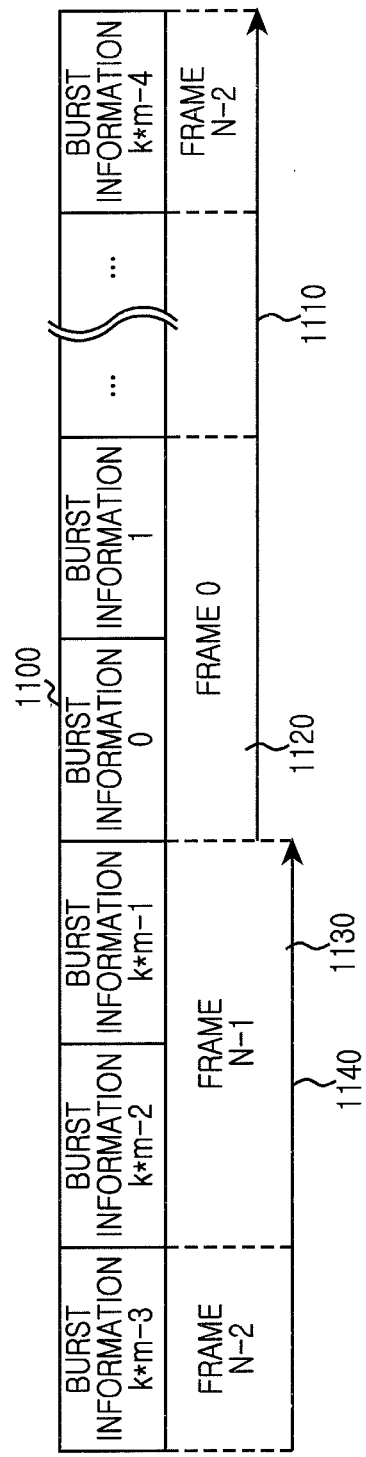
FIG. 11 is a diagram of burst information in a storage part according to an exemplary embodiment of the present invention.

FIG. 11 illustrates burst information in a storage part according to an exemplary embodiment of the present invention.

Referring to FIG. 11, the burst information region 1100 may be the burst information region 830 of FIG. 8, or one storage region for storing the burst information of a particular user in the burst information region 930 of FIG. 9. For example, the burst information region 1100 may store burst information from burst information 0 to the burst information k*m−1. The burst information k*m−2 and the burst information k*m−1 are stored in the burst information region 1100 over the frame N−1 1130. k denotes the total number of the frames for storing the burst information and m denotes the maximum number of the HARQ bursts receivable in one frame. In FIG. 11, m is 2, and thus the number of the HARQ bursts receivable over one frame is 2. The burst information is stored from the frame 0 1120 to the frame N−1 1130 along the arrow 1110, and then the burst information may be continually stored along the arrow 1140 in a circulating manner.

Figure 12:
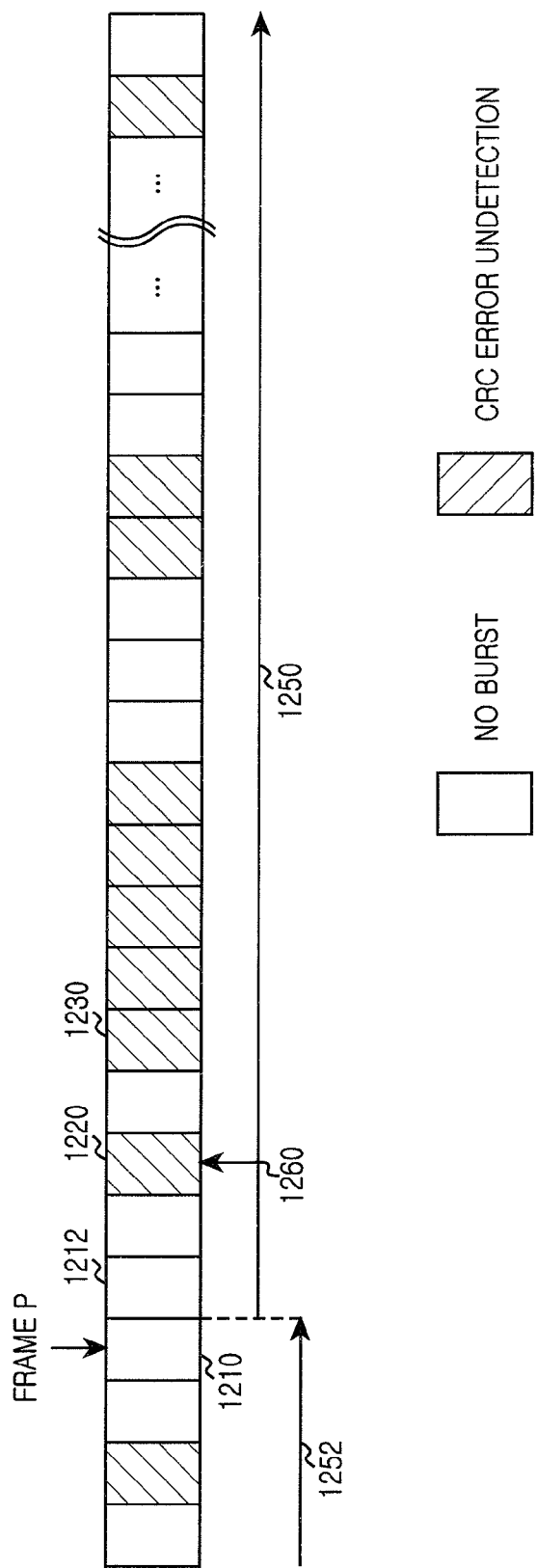
FIG. 12 is a diagram of a HARQ burst order control using burst information according to an exemplary embodiment of the present invention.

FIG. 12 illustrates a HARQ burst order control using burst information according to an exemplary embodiment of the present invention.

Referring to FIG. 12, the control part 732 of FIG. 7 may control the order of the HARQ burst using the burst information stored in the burst information region. The burst information region in FIG. 12 may be the burst information region 830 of FIG. 8, or one storage region for storing the burst information of a particular user in the burst information region 930 of FIG. 9.

Referring to FIG. 12, one burst information is stored per frame as in FIG. 10. It may be assumed that the burst information 1210 is stored in the current frame P. An arrow 1250 through an arrow 1252 may indicate the time order of the frames storing the burst information. The burst information on the immediate right of the burst information 1210 stored in the current frame P; the burst information 1212 at the start of the arrow 1250 may be the oldest frame.

The burst information may be sequentially stored in each frame along the arrow 1250. When the end of the burst information region is filled with the burst information, other part of the burst information region may be used as well. The burst information may additionally fill the region from the start of the burst information region to the current frame P along the arrow 1252.

The burst information 1210 indicates the absence of the HARQ burst in the current frame P. The control part 732 of FIG. 7 may process PDUs of the HARQ bursts starting from the HARQ burst corresponding to the burst information stored in a certain frame in order, according to the burst information. For example, the receiver may confirm the burst information stored in the earliest frame in the time axis and determine whether the corresponding frame includes the HARQ burst of the burst information. When detecting the HARQ burst, the receiver may confirm the CRC result of the HARQ burst of the burst information in the corresponding frame. When the HARQ burst exists and the CRC result does not indicate the presence of errors, the HARQ burst corresponding to the burst information stored in the corresponding frame may be PDU-processed. The PDU-processed HARQ burst may be input to the burst processing part 740 or the PDU processing part 750 by referring to the allocation information stored in the corresponding burst information or the index indicating the allocation information. By sequentially checking from the burst information stored in the earliest frame, the HARQ burst corresponding to the burst information 1220 indicating the presence of the HARQ burst stored in the frame 1260 and the CRC result indicating the lack of errors may be PDU-processed first. The HARQ burst corresponding to the burst information 1230 may be PDU-processed after the HARQ burst corresponding to the burst information 1220.

Figure 13:
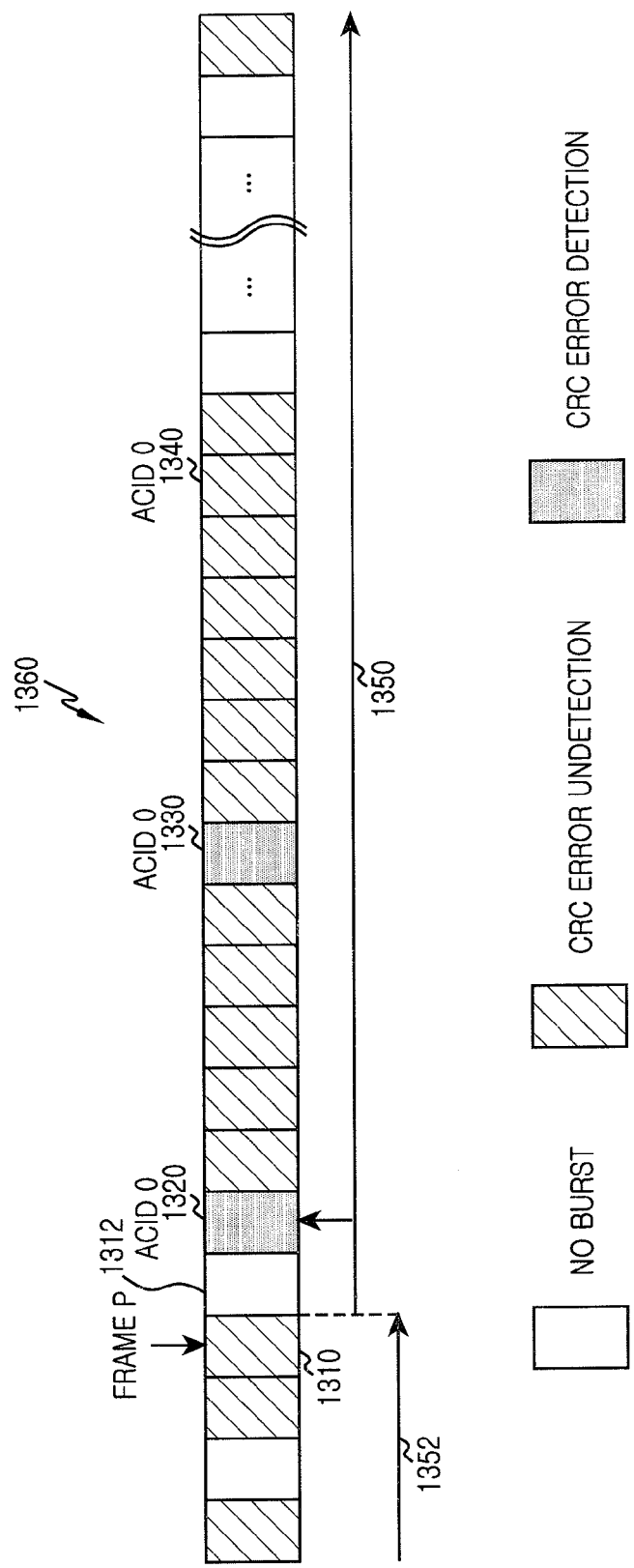
FIG. 13 is a diagram of the HARQ burst order control using burst information according to an exemplary embodiment of the present invention.

FIG. 13 illustrates the HARQ burst order control using burst information according to an exemplary embodiment of the present invention.

Referring to FIG. 13, the control part 732 of FIG. 7 may control the order of the HARQ burst using the burst information stored in the burst information region. The burst information region in FIG. 13 may be the burst information region 830 of FIG. 8, or one storage region for storing the burst information of a particular user in the burst information region 930 of FIG. 9. In FIG. 13, one burst information is stored per frame as in FIG. 10. The burst information 1312 on the immediate right of the burst information 1310 is stored in the current frame P; the burst information at the start of the arrow 1350 may be the oldest frame. The burst information may be sequentially stored in each frame along the arrow 1350. When the burst information reaches the end of the burst information region, up to the burst information 1310 of the current frame P may be stored from the start of the following burst information region along the arrow 1352.

The control part 732 of FIG. 7 may process PDUs of the HARQ bursts starting from the HARQ burst corresponding to the burst information stored in a certain frame in order, according to the burst information. For example, the receiver may confirm first the burst information stored in the earliest frame in the time axis and thus determine whether the corresponding frame includes the HARQ burst of the burst information. When detecting the HARQ burst, the receiver may confirm the CRC result of the HARQ burst of the burst information in the corresponding frame. For example, when the CRC result of the HARQ burst of the burst information 1320 stored in the frame 1360 indicates the presence of errors, the receiver may sequentially search for the burst information of the same ACID as the ACID of the burst information 1320 after the frame 1360. The ACID in the burst information 1320 may be zero. While the ACID in the burst information 1330 is the same as the ACID of the burst information 1320, the receiver may continue the burst information search because the CRC result of the burst information 1330 indicates the presence of errors. Accordingly, the ACID in the searched burst information 1340 is the same as the ACID of the burst information 1320, and the CRC result of the burst information 1340 may not indicate the presence of errors. The control part 732 of FIG. 7 may process PDUs of the HARQ burst corresponding to the burst information 1340 prior to the HARQ bursts after the frame 1360.

After the HARQ burst corresponding to the burst information 1320 is PDU-processed, the burst information 1320, the burst information 1330, and the burst information 1340 may be deleted. When the burst information 1320, the burst information 1330, and the burst information 1340 are deleted, the HARQ bursts and the allocation information corresponding to the burst information may be deleted together. After the HARQ burst corresponding to the burst information 1340 is PDU-processed, the burst information 1320, the burst information 1330, and the burst information 1340 may include the field indicating the absence of the HARQ burst.

When the CRC result of the HARQ burst in the burst information 1320 indicates the presence of errors, the receiver may search for the burst information having the same ACID as the ACID of the burst information 1320 and indicating that the corresponding HARQ burst is the retransmission burst, after the frame 1360 in sequence. For example, whether the HARQ bursts contained in the burst information 1330 and the burst information 1340 are the retransmission burst may indicate the retransmission burst. When the corresponding HARQ burst of the burst information 1330 indicates the retransmission burst and the corresponding HARQ burst of the burst information 1340 indicates the initial transmission burst, the control part 732 may detect the end of the retransmission for the HARQ bursts corresponding to the burst information 1320 and the burst information 1330. The burst information 1320 and the burst information 1330 may be deleted and the HARQ burst corresponding to the burst information 1322 on the immediate right of the burst information 1320 may be PDU-processed first.

Figure 14:
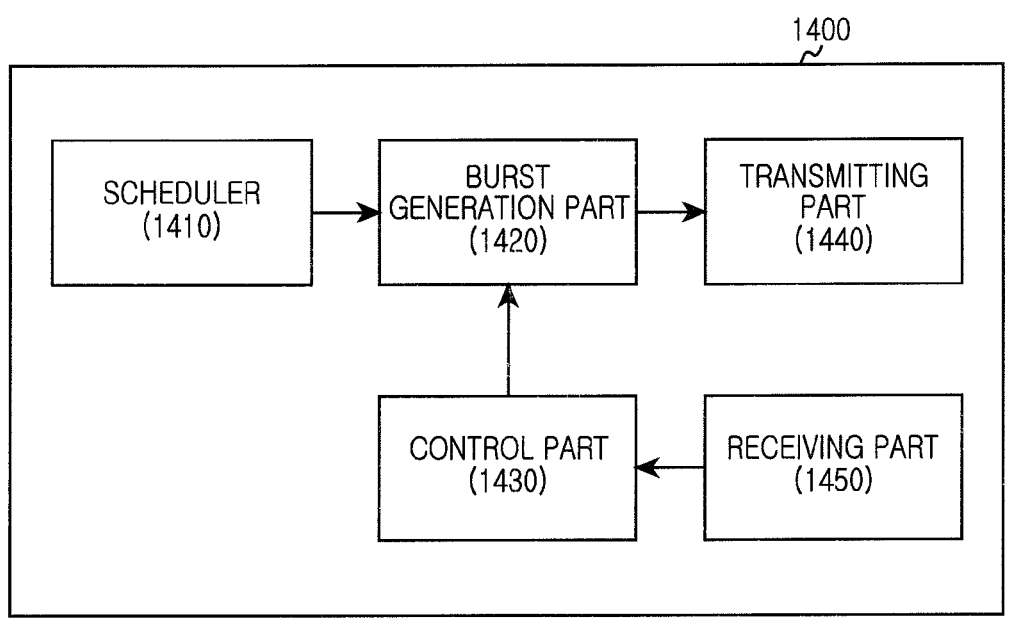
FIG. 14 is a block diagram of a transmitter according to an exemplary embodiment of the present invention.

FIG. 14 is a block diagram of a transmitter according to an exemplary embodiment of the present invention.

Referring to FIG. 14, the transmitter 1400 may include a control part 1430 and a transmitting part 1440. The control part 1430 may obtain at least one PDU according to the decoding order of the receiver which supports the HARQ mode. The transmitting part 1440 may transmit to the receiver at least one HARQ burst including at least one PDU and the burst CRC field.

The transmitter 1400 may include a scheduler 1410, a burst generation part 1420, and a receiving part 1450. The scheduler 1410 may schedule to transmit the data generated by the transmitter 1400. The scheduler 1410 may be replaced by a buffer or omitted. The burst generation part 1410 may generate the HARQ burst with the data to transmit. The control part 1430 may obtain at least one PDU to include in the HARQ burst generated by the burst generation part 1420, according to the decoding order of the receiver which supports the HARQ mode. The signal decoding order indicates the pre-arranged resource allocation order for the uplink frame resource or the downlink frame resource. The pre-arranged resource allocation order may be any one of the frequency-first order from the start slot of the allocation in the resource allocated region or the time-first order from the start slot of the allocation in the resource allocated region. The HARQ burst generated by the burst generation part 1420 may indicate the order of the PDUs as the PDU arrangement order, without using the separate field indicating the order of one or more PDUs.

The receiving part 1450 may receive the resource allocation information from the receiver. The resource allocation information may include the ACID, the connection identifier, and the AI SN for each HARQ burst. The control part 1430 may control the order of one or more PDUs to include in the HARQ burst using the resource allocation information. When the plurality of the HARQ bursts is generated, the control part 1430 may control the order of the HARQ bursts. When the transmitter 1400 generates the resource allocation information or transmits the resource allocation information to the receiver, the control part 1430 may receive the resource allocation information from the scheduler 1410.

The receiving part 1450 may receive from the receiver a control message including information indicating that the field indicating the order of the PDUs is not supported. The transmitting part 1440 may transmit the at least one HARQ burst generated by the burst generation part 1420 to the receiver. The at least one HARQ burst transmitted from the transmitting part 1440 may occupy frequency and time resources corresponding to the resource allocation information in the frame. The transmitting part 1440 may transmit to the receiver the control message including the information indicating no support of the field indicative of the order of the PDUs. The burst CRC field in each HARQ burst transmitted from the transmitting part 1440 is attached to data including at least one PDU and may be used for the receiver to detect the error in each HARQ burst.

The HARQ bursts transmitted from the transmitter 1400 may each use a separate field indicating the order of the one or more PDUs. When the arrangement order of the PDUs or the arrangement order of the bursts matches the separate field indicating the order of the one or more PDUs, the receiver, receiving the corresponding HARQ burst, may control the order of the HARQ burst and the order of the PDUs regardless of the separate field indicating the order of the PDUs.

Figure 15:
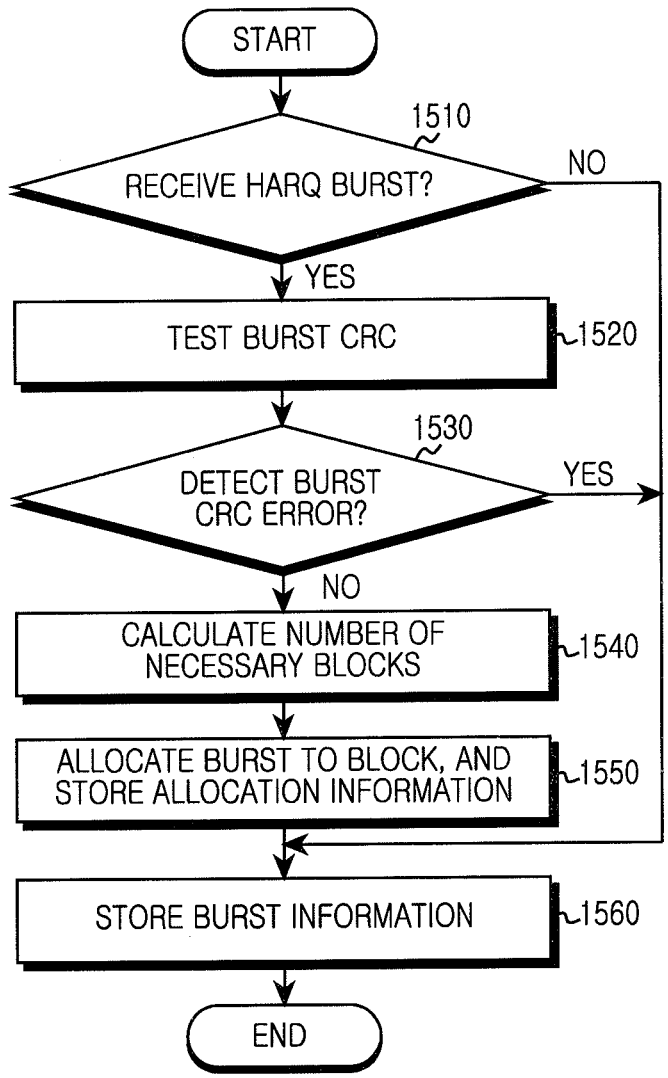
FIG. 15 is a flowchart of a method for storing a HARQ burst in a receiver according to an exemplary embodiment of the present invention.

FIG. 15 is a flowchart of a method for storing the HARQ burst at the receiver according to an exemplary embodiment of the present invention.

Referring to FIG. 15, in step 1510, the receiver receives the HARQ burst from the transmitter and determines whether the HARQ burst is received in every frame. When the HARQ burst is not received in step 1510, the receiver stores the burst information of the corresponding HARQ burst in step 1560. The burst information may include the field indicating the absence of the HARQ burst. When the HARQ burst is received in step 1510, the receiver tests the CRC for the received HARQ burst in step 1520. The CRC test may use at least one of the burst CRC and the CRC of the PDUs in the corresponding HARQ burst. In step 1530, the receiver determines whether the burst CRC result of the corresponding HARQ burst is the error detection. To determine whether errors are present in the corresponding HARQ burst, the receiver may utilize at least one of the burst CRC and the CRC result of the PDUs in the corresponding HARQ burst.

When the burst CRC result indicates the presence of errors in step 1530, the receiver stores the burst information for the corresponding HARQ burst in step 1560. The burst information may include the field indicating the existence of the HARQ burst, the field indicating the presence of errors in the corresponding HARQ burst, information of whether the HARQ burst is the retransmission burst, and the ACID. The allocation information or the index indicating the allocation information may be omitted in the burst information.

When the burst CRC result does not indicate the presence of errors in step 1530, the receiver calculates the number of the blocks required to store the corresponding HARQ burst in the storage part in step 1540. In step 1550, the receiver stores the corresponding HARQ burst by allocating the corresponding HARQ burst to the calculated number of the blocks, and stores the allocation information of the corresponding HARQ burst. In so doing, the receiver may sequentially store the corresponding HARQ burst in the storage part regardless of the connection identifier of the transmitter or the user information of the transmitter. In step 1560, the receiver sequentially stores the burst information including the ACID of the corresponding HARQ burst, which identifies the channel corresponding to the corresponding HARQ burst, in each frame. The burst information may include the information of whether the HARQ burst exists, the information of whether the corresponding HARQ burst is the retransmission burst, the CRC result of the corresponding HARQ burst, and the allocation information (or the index indicating the allocation information). In step 1560, the receiver may detect the storage region of the storage part which stores the corresponding burst information according to at least one of the connection identifier of the transmitter and the user information of the transmitter, and sequentially store the corresponding burst information to the detected storage region in every frame.

Alternatively, after step 1520, the receiver may omit step 1530 and perform step 1540. In this case, the receiver may store all of the received HARQ bursts in the storage part regardless of the CRC error detection or undetection.

Figure 16:
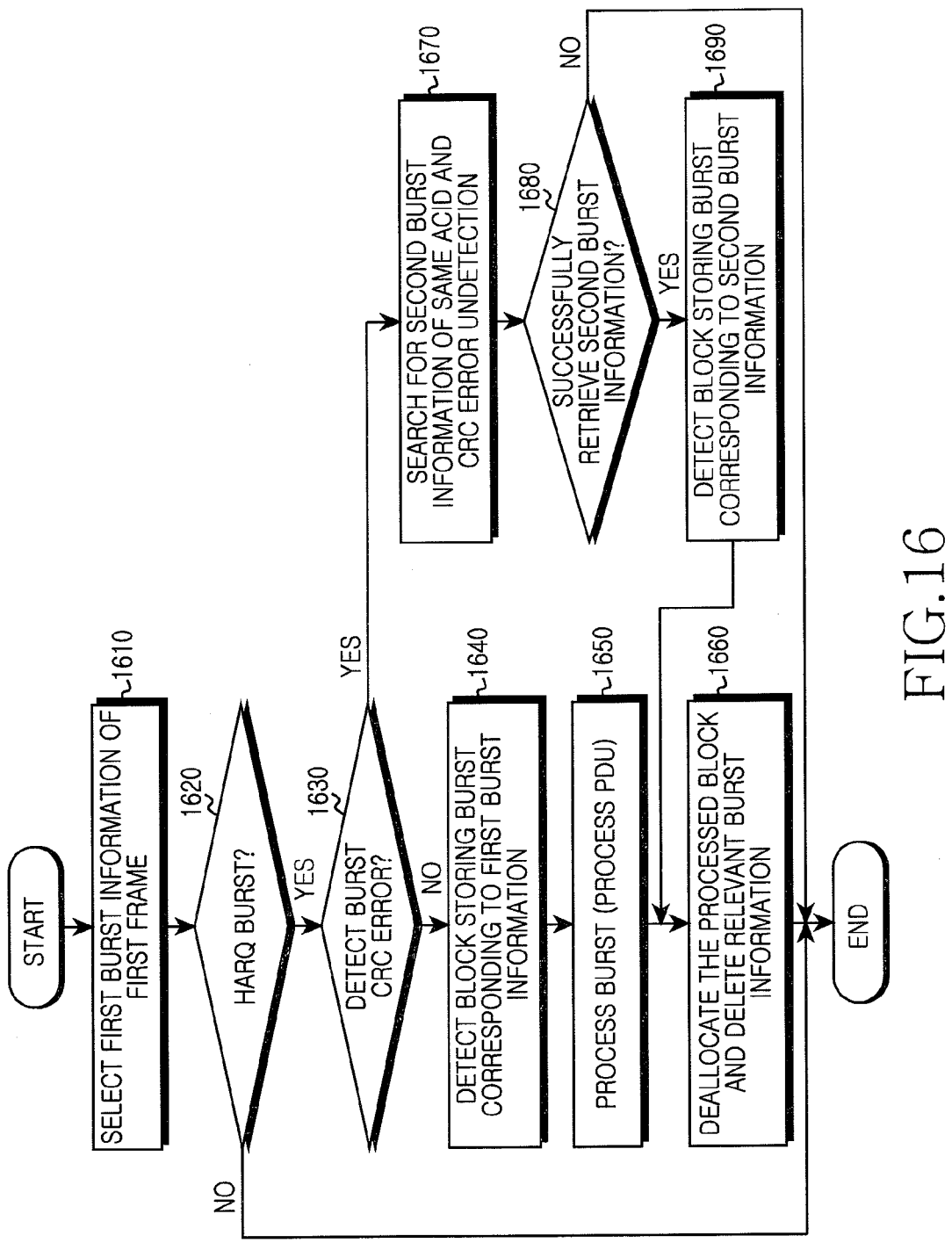
FIG. 16 is a flowchart of a method for controlling a HARQ burst order in a receiver according to an exemplary embodiment of the present invention.

FIG. 16 is a flowchart of a method for controlling HARQ burst order in a receiver according to an exemplary embodiment of the present invention.

Referring to FIG. 16, the receiver may sequentially detect the burst information stored in the corresponding frame from a certain frame. According to the burst information, the receiver may process PDUs of the HARQ bursts starting from the HARQ burst corresponding to the burst information stored in the certain frame. The receiver selects the first burst information stored in the certain first frame in step 1610.

In step 1620, the receiver determines whether a HARQ burst is present according to the first burst information. When there is no HARQ burst in step 1620, the receiver finishes the order control of the HARQ burst. When the corresponding frame includes no HARQ burst in step 1620, the receiver may select the burst information stored in the next frame and then proceed to step 1620.

When the corresponding frame includes the HARQ burst in step 1620, the receiver determines whether the burst CRC result of the first burst information indicates the presence of errors in step 1630. When the burst CRC result does not indicate the presence of errors in step 1630, the receiver detects the block of the storage part storing the HARQ burst corresponding to the first burst information in step 1640. The receiver may detect the block of the storage part using at least one of the allocation information and the index indicating the allocation information. In step 1650, the receiver burst-processes (or PDU-processes) the HARQ burst corresponding to the first burst information stored in the detected block. In step 1660, the receiver deallocates the burst for the block storing the processed HARQ burst and deletes the first burst information. The receiver may delete the allocation information together with the first burst information. Instead of deleting the first burst information, the receiver may update the first burst information to include the value indicating the absence of the HARQ burst in the first frame.

When the burst CRC result of the first burst information indicates the presence of errors in step 1630, after the first frame, the receiver sequentially retrieves the second burst information having the same ACID as the ACID of the first burst information and having no errors in step 1670. In step 1670, the receiver may retrieve the second burst information having the same ACID as the ACID of the first burst information, indicating the retransmission burst, and indicating that no errors are present. By searching the burst region information after the first frame in sequence, the receiver determines whether the second burst information search is successful in step 1680. When the second burst information search fails in step 1680, the receiver finishes the HARQ burst order control. The receiver may wait to receive the retransmission HARQ burst of the same ACID, and finish the processing of the corresponding HARQ burst according to a timer or the number of the retransmissions.

When the second burst search is successful in step 1680, the receiver detects the block of the storage part storing the HARQ burst corresponding to the second burst information in step 1690. The receiver burst-processes (or PDU-processes) the HARQ burst corresponding to the second burst information stored in the detected block, prior to the HARQ bursts after the first frame in step 1650. In step 1660, the receiver deallocates the burst for the block storing the processed HARQ burst and deletes the first burst information and the second burst information. The receiver may delete the burst information of the same ACID stored between the first burst information and the second burst information together. Instead of deleting the first burst information and the second information, the receiver may update the first burst information and the second burst information to include the value indicating the absence of the HARQ burst.

Figure 17:
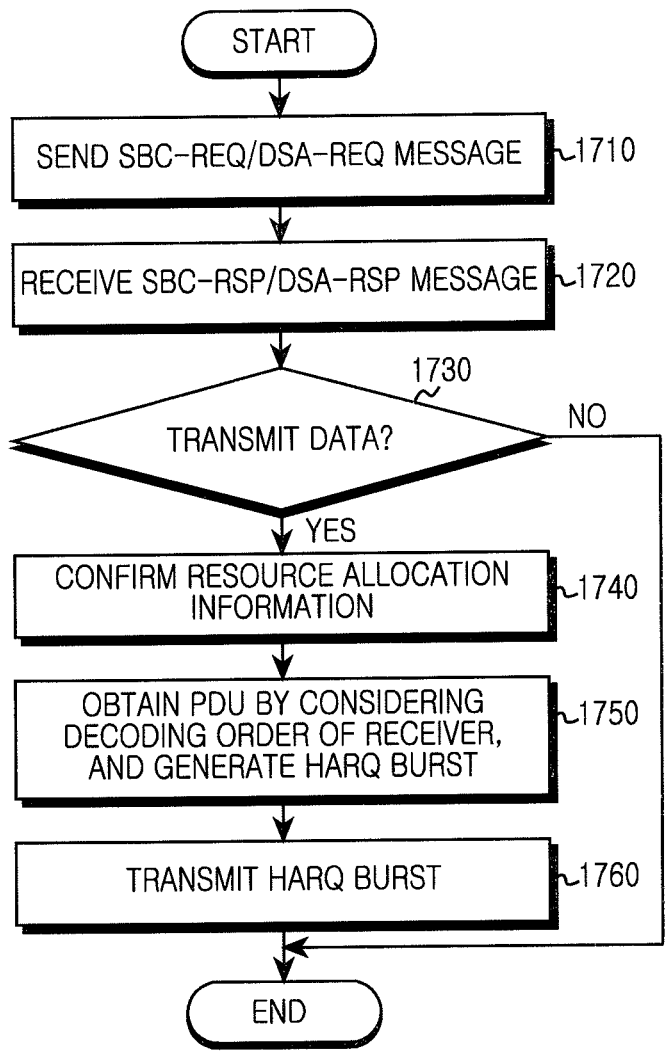
FIG. 17 is a flowchart of a method for transmitting a HARQ burst in a transmitter according to an exemplary embodiment of the present invention.

FIG. 17 is a flowchart of a method for transmitting a HARQ burst in a transmitter according to an exemplary embodiment of the present invention.

Referring to FIG. 17, in step 1710, the transmitter transmits to the receiver, a request control message including the information indicating no support of the field indicative of the order of one or more PDUs. The request control message may be at least one of the SBC negotiation message and the DSA related message. For example, the request control message may be at least one of the SBC-REQ message and the DSA-REQ message.

In step 1720, the transmitter receives from the receiver a response control message including the information indicating no support of the field indicative of the order of the one or more PDUs. The response control message may be at least one of the SBC negotiation message and the DSA related message. For example, the response control message may be at least one of the SBC-RSP message and the DSA-RSP message. In various implementations, at least one of step 1710 and step 1720 may be omitted.

In step 1730, the transmitter determines whether data is to be transmitted to the receiver. When no data is to be transmitted in step 1730, the transmitter finishes the HARQ burst transmission. When data is to be transmitted in step 1730, the transmitter confirms the resource allocation information for the HARQ burst transmission in step 1740. The resource allocation information may be received from the receiver, or obtained inside the transmitter or through the scheduler of the transmitter.

In step 1750, the transmitter obtains at least one PDU according to the decoding order of the receiver which supports the HARQ mode and generates the HARQ burst. The generated HARQ burst may indicate the order of the PDUs as the arrangement order of the PDUs, without using the separate field indicating the order of the PDUs. The signal decoding order of the receiver may be the pre-arranged resource allocation order for the uplink frame resource or the downlink frame resource. The pre-arranged resource allocation order may be either the frequency-first order from the start slot of the allocation in the resource allocated region, or the time-first order from the start slot of the allocation in the resource allocated region. In step 1760, the transmitter transmits the generated HARQ burst to the receiver.

Certain aspects of the present invention may be embodied as program commands executable through various computer means and recorded to a computer-readable medium. The computer-readable medium may include program commands, data files, data structures, and the like alone or in combination. The program commands recorded to the medium may be designed and constructed especially for the implementations of the present invention, or well known to those skilled in the computer software. Although some or a portion of the components described above may be embodied as program commands, it would be apparent that other portions, or other components, can only be implemented or fully implemented through the use of hardware devices, including antennas, processors, integrated circuits, displays, input devices, and the like.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a receiver for receiving a Hybrid Automatic Repeat reQuest (HARQ) burst in a communication system, the method comprising:
   receiving at least two HARQ bursts from a transmitter;
   storing burst information including a HARQ Channel IDentifier (ACID) of each of the at least two HARQ bursts for identifying a channel corresponding to the at least two HARQ bursts; and
   controlling an order of the at least two HARQ bursts by comparing the ACID of each of the at least two HARQ bursts,
   wherein the at least two HARQ bursts have the same ACID.

2. The method of claim 1, wherein the burst information is sequentially stored per frame, and
   the controlling of the order of the at least two HARQ bursts comprises processing Protocol Data Units (PDUs) of a HARQ burst in order starting from a HARQ burst corresponding to burst information stored in a certain frame according to the burst information.

3. The method of claim 2, wherein the burst information further comprises a Cyclic Redundancy Check (CRC) result of the HARQ burst, and
   wherein the controlling of the order of the at least two HARQ bursts comprises:
   when a CRC result of a HARQ burst in first burst information stored in a first frame indicates the presence of errors, searching for second burst information of the same ACID as an ACID of the first burst information, in sequence after the first frame.

4. The method of claim 2, wherein the burst information further comprises a CRC result of the HARQ burst, and
   wherein the controlling of the order of the at least two HARQ bursts comprises:
   when a CRC result of a HARQ burst in first burst information stored in a first frame indicates the presence of errors, searching for second burst information of the same ACID as an ACID of the first burst information, in sequence after the first frame; and
   processing PDUs of a HARQ burst corresponding to the second burst information before HARQ bursts after the first frame.

5. The method of claim 2, wherein the burst information further comprises a CRC result of the HARQ burst, and
   the controlling of the order of the at least two HARQ bursts comprises:
   when a CRC result of a HARQ burst in first burst information stored in a first frame indicates the presence of errors, searching for second burst information of the same ACID as an ACID of the first burst information, in sequence after the first frame;
   processing PDUs of a HARQ burst corresponding to the second burst information before HARQ bursts after the first frame; and
   deleting the first burst information and the second burst information.

6. The method of claim 1, wherein the burst information further comprises information of whether each frame comprises a HARQ burst, information of whether the corresponding HARQ burst is a retransmission burst, and a CRC result of the corresponding HARQ burst.

7. A method of a transmitter for transmitting a Hybrid Automatic Repeat reQuest (HARQ) burst in a communication system, the method comprising:
   obtaining at least one Protocol Data Unit (PDU) for decoding according to an order controlling at least two HARQ bursts for a receiver which supports a HARQ mode;
   transmitting the at least two HARQ bursts to the receiver, the at least two HARQ bursts including the at least one PDU and a burst Cyclic Redundancy Check (CRC) field; and
   receiving a control message including information which indicates that an order of the at least one PDU is not supported,
   wherein the at least two HARQ bursts have the same ACID.

8. The method of claim 7, wherein the at least two HARQ bursts each indicates an order of the at least one PDU using an arrangement order of the at least one PDU.

9. The method of claim 7, wherein the decoding order of the receiver indicates a pre-arranged resource allocation order for an uplink frame resource or a downlink frame resource, and
   the pre-arranged resource allocation order is any one of a frequency-first order from a start slot of allocation in a resource allocated region, and a time-first order from the start slot of the allocation in the resource allocated region.

10. An apparatus of a receiver for receiving a Hybrid Automatic Repeat reQuest (HARQ) burst in a communication system, the apparatus comprising:
   a receiving part for receiving at least two HARQ bursts from a transmitter;
   a storage part for storing burst information including a HARQ Channel IDentifier (ACID) of each of the at least two HARQ bursts for identifying a channel corresponding to the at least two HARQ bursts; and
   a control part for controlling an order of the at least two HARQ bursts by comparing the ACID of each of the at least two HARQ bursts,
   wherein the at least two HARQ bursts have the same ACID.

11. The apparatus of claim 10, wherein the control part sequentially stores the burst information per frame, and processes Protocol Data Units (PDUs) of a HARQ burst in order starting from a HARQ burst corresponding to burst information stored in a certain frame according to the burst information.

12. The apparatus of claim 11, wherein the burst information further comprises a Cyclic Redundancy Check (CRC) result of the HARQ burst, and
when a CRC result of a HARQ burst in first burst information stored in a first frame indicates the presence of errors, the control part searches for second burst information of the same ACID as an ACID of the first burst information, in sequence after the first frame.

13. The apparatus of claim 11, wherein the burst information further comprises a CRC result of the HARQ burst, and
wherein, when a CRC result of a HARQ burst in first burst information stored in a first frame indicates the presence of errors, the control part searches for second burst information of the same ACID as an ACID of the first burst information, in sequence after the first frame, and processes PDUs of a HARQ burst corresponding to the second burst information before HARQ bursts after the first frame.

14. The apparatus of claim 11, wherein the burst information further comprises a CRC result of the HARQ burst, and when a CRC result of a HARQ burst in first burst information stored in a first frame indicates the presence of errors, the control part searches for second burst information of the same ACID as an ACID of the first burst information, in sequence after the first frame, processes PDUs of a HARQ burst corresponding to the second burst information before HARQ bursts after the first frame, and deletes the first burst information and the second burst information.

15. The apparatus of claim 10, wherein the storage part sequentially stores the at least two HARQ bursts, regardless of a connection identifier of the transmitter or user information of the transmitter.

16. The apparatus of claim 10, wherein the control part detects a storage region of the storage part which stores the burst information according to at least one of a connection identifier of the transmitter and user information of the transmitter, and sequentially stores the burst information in the detected storage region per frame.

17. The apparatus of claim 10, wherein the storage part comprises a plurality of blocks, the blocks each in a preset size, and
the control part stores the at least two HARQ bursts in at least one of the blocks.

18. The apparatus of claim 17, wherein, when the at least two HARQ bursts comprises a first HARQ burst and a second HARQ burst and a portion of a particular block allocated the first HARQ burst is empty, the control part stores the second HARQ burst in a block other than the particular block.

19. The apparatus of claim 10, wherein the storage part comprises a plurality of blocks, the blocks each in a preset size,
wherein the burst information further comprises allocation information indicating the at least two HARQ bursts stored in the storage part,
wherein the allocation information includes a start address of at least one block storing a particular HARQ burst of the at least two HARQ bursts, size information and connection information of the particular HARQ burst stored in the at least one block, and
wherein the connection information, when the particular HARQ burst is divided and stored in at least two blocks, indicates connection of the at least two blocks.

20. The apparatus of claim 10, wherein the burst information further comprises information of whether each frame comprises the HARQ burst, information of whether the corresponding HARQ burst is the retransmission burst, and a CRC result of the corresponding HARQ burst.

21. An apparatus of a transmitter for transmitting a Hybrid Automatic Repeat reQuest (HARQ) burst in a communication system, the apparatus comprising:
a control part for obtaining at least one Protocol Data Unit (PDU) for decoding according to an order controlling at least two HARQ bursts for a receiver which supports a HARQ mode;
a transmitting part for transmitting, to the receiver, the at least two HARQ bursts comprising the at least one PDU and a burst Cyclic Redundancy Check (CRC) field; and
a receiving part for receiving a control message from the receiver, the control message including information which indicates that a field indicating an order of the at least one PDU is not supported,
wherein the at least two HARQ bursts have the same ACID.

22. The apparatus of claim 21, wherein the at least two HARQ bursts each indicates an order of the at least one PDU using an arrangement order of the at least one PDU.

23. The apparatus of claim 21, wherein the at least one PDU comprises a Generic Media Access Control (MAC) Header (GMH), a payload, and a CRC field.

24. The apparatus of claim 21, wherein the control message is at least one of a Subscriber Station Basic Capability (SBC) negotiation related message and a Dynamic Service Addition (DSA) related message.

25. The apparatus of claim 21, wherein the transmitter transmits a control message to the receiver, the control message including information indicating that a field indicating an order of the at least one PDU is not supported, and
wherein the control message is at least one of a SBC negotiation related message and a DSA related message.

26. The apparatus of claim 21, wherein the decoding order of the receiver indicates a pre-arranged resource allocation order for an uplink frame resource or a downlink frame resource, and
the pre-arranged resource allocation order is any one of a frequency-first order from a start slot of allocation in a resource allocated region, and a time-first order from the start slot of the allocation in the resource allocated region.

27. The apparatus of claim 21, wherein the burst CRC field is attached to data including the at least one PDU and used for the receiver to detect errors in the at least one HARQ burst.

28. The apparatus of claim 21, wherein the at least two HARQ bursts occupies frequency and time resources corresponding to resource allocation information in a frame which carries the at least two HARQ bursts, and
the resource allocation information comprises a HARQ Channel IDentifier (ACID), a connection identifier, and a HARQ Identifier Sequence Number (AI SN) for each of the at least two HARQ bursts.

* * * * *